United States Patent [19]

Markham

[11] Patent Number: 5,796,836
[45] Date of Patent: Aug. 18, 1998

[54] SCALABLE KEY AGILE CRYPTOGRAPHY

[75] Inventor: Thomas R. Markham, Anoka, Minn.

[73] Assignee: Secure Computing Corporation, Roseville, Minn.

[21] Appl. No.: 521,056

[22] Filed: Aug. 29, 1995

Related U.S. Application Data

[63] Continuation-in-part of Ser. No. 518,617, Aug. 23, 1995, abandoned, which is a continuation-in-part of Ser. No. 423,082, Apr. 17, 1995, abandoned.

[51] Int. Cl.$^6$ ..................................................... H04L 9/28
[52] U.S. Cl. .............................. 380/28; 380/37; 380/42; 380/43; 380/46
[58] Field of Search ..................... 380/37, 42, 43, 380/46, 50, 28; 364/717

[56] References Cited

U.S. PATENT DOCUMENTS

| | | | |
|---|---|---|---|
| 4,058,673 | 11/1977 | Johansson | 380/50 |
| 4,142,240 | 2/1979 | Ward et al. | 364/717 |
| 4,160,120 | 7/1979 | Barnes et al. | 380/29 |
| 4,447,672 | 5/1984 | Nakamura | 380/50 |
| 4,731,843 | 3/1988 | Holmquist | 380/29 |
| 4,897,876 | 1/1990 | Davies | 380/43 |
| 5,148,485 | 9/1992 | Dent | 380/46 |
| 5,345,508 | 9/1994 | Lynn et al. | 380/46 |
| 5,381,480 | 1/1995 | Butter et al. | 380/37 |

OTHER PUBLICATIONS

Schneier, Bruce "Applied Cryptography: Protocols, Algorithms and Source Code in C", John Wiley and Sons, New York, Chapter 8 (1992).

C. H. Meyer and W. L. Tuchman, "Serial/Parallel Operation of Crypto Devices", IBM Technical Disclosure Bulletin, vol. 22 No. 2, Jul. 1979.

Robert Rosenberg, "Slamming the Door on Data Thieves," *Electronics*, 27–31 (Feb. 3, 1986).

Daniel Stevenson, et al., "Design of a Key Agile Cryptographic System for OC–12c Rate ATM*," *IEEE*, 17–30 (1995).

Daniel Stevenson, et al., "Secure Communications in ATM Networks," *Communictions of the ACM*, 38, 45–52 (Feb. 1995).

*Primary Examiner*—Thomas H. Tarcza
*Assistant Examiner*—Pinchus M. Laufer
*Attorney, Agent, or Firm*—Schwegman, Lundberg, Woessner & Kluth, P.A.

[57] ABSTRACT

A system and method for encrypting blocks of plain text. Output FIFO memories are provided for decoupling pseudorandom vector generation from plain text encryption. The output FIFOs produce the effect of multiplexing several cryptographic devices together and can be combined with feedback FIFO memories in order to provide key agility and parallel secret key encryption. Throughput is also enhanced by constructing wide codebooks so that a block of data can be enciphered as a whole.

46 Claims, 22 Drawing Sheets

KEY AGILE CIPHER FEEDBACK

CIPHER BLOCK CHAINING

OUTPUT FEEDBACK

DUAL CODEBOOK CIPHER FEEDBACK

DUAL CODEBOOK OUTPUT FEEDBACK

DUAL CODEBOOK CIPHER BLOCK CHAINING

KEY AGILE CIPHER FEEDBACK

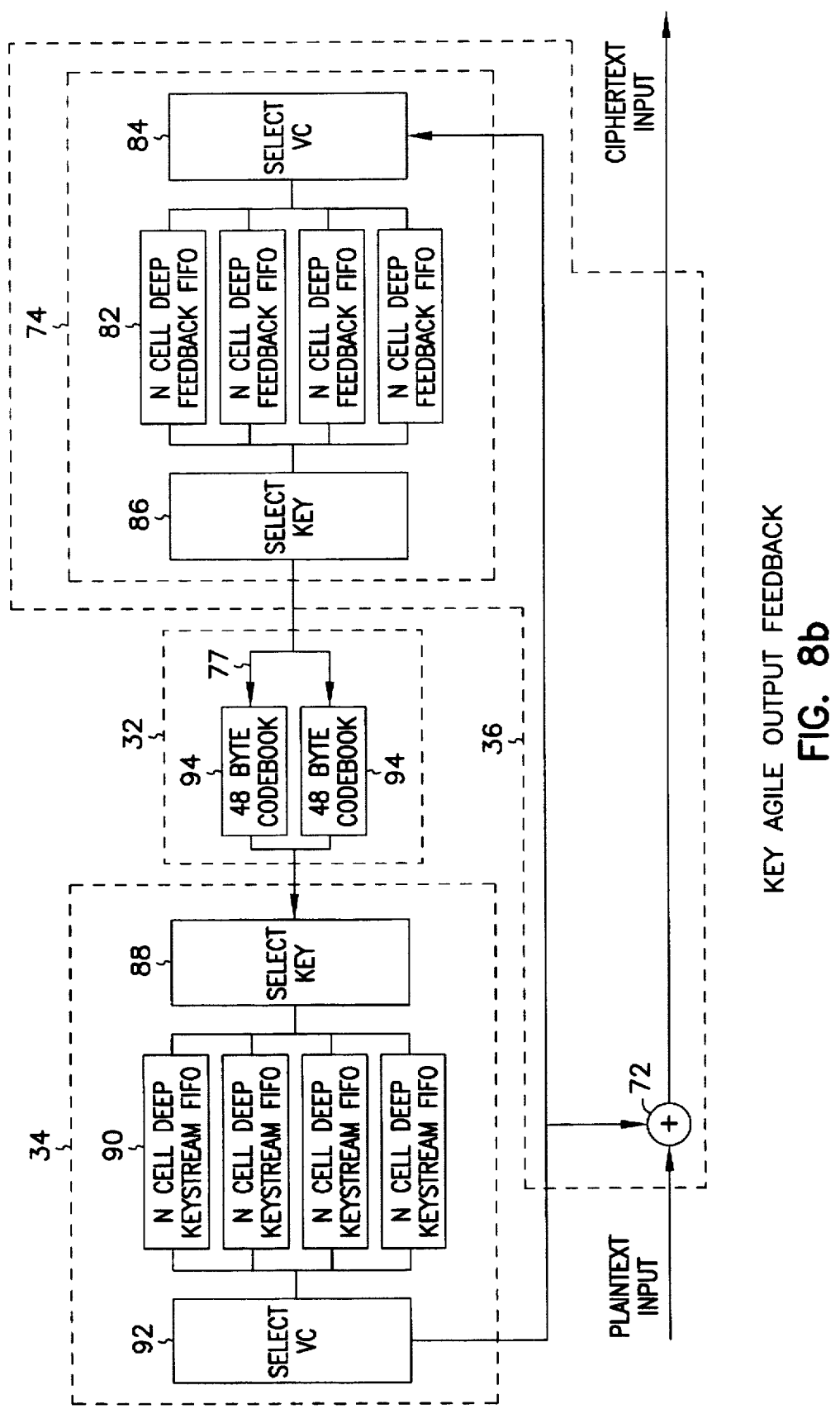
FIG. 8b KEY AGILE OUTPUT FEEDBACK

SECURE ATM SYSTEM 5,796,836

SCALABLE KEY AGILE CRYPTOGRAPHY

This application is a Continuation-in-part of U.S. patent application Ser. No. 08/518,617 filed on Aug. 23, 1995 and entitled "Scalable Key Agile Cryptography," which is a Continuation-in-part of U.S. patent application Ser. No. 08/423,082 filed on Apr. 14, 1995 and entitled "Scalable Key Agile Cryptography," both now abandoned.

BACKGROUND OF THE INVENTION

1. Field of the Invention

The present invention relates to a method and apparatus for encrypting and decrypting data, and more particularly to a method and apparatus for scalable, key agile cryptography.

2. Background Information

Data security and secure data transmission have received greater attention recently as computer users become aware of the value and sensitivity of their data and of the threats posed to the privacy of that data. A variety of data encryption algorithms have been described which address these concerns. One of the most common is the secret key Data Encryption Standard (DES) algorithm published as part of the Data Encryption Standard. The DES algorithm provides the user with a set of functions each of which transforms a 64-bit input to a 64-bit output. The user selects which of the functions to use by selecting a particular 56-bit key. Secret key systems such as DES are much faster than public key systems such as RSA and are, therefore, better suited for bulk encryption functions.

DES has four basic modes of operation: electronic codebook (ECB), cipher block chaining (CBC), cipher feedback (CFB) and output feedback (OFB). In ECB (illustrated in FIG. 1a), a DES encryption device (codebook 12) encrypts a 64-bit plain text block 10 with a specific 64-bit pseudorandom vector (not shown). The result (cipher text block 14) is a nonlinear function of the input block. Cipher text block 14 is decrypted by a DES decryption device (codebook 16) to produce a plain text block 18 which should be identical to plain text block 10.

In CBC (illustrated in FIG. 1b), 64-bit plain text block 10 is modulo-two added to an initial 64-bit pseudorandom vector 20 (called an initialization vector) before being encrypted by codebook 12. The resulting cipher text block 14 is transmitted. In addition, cipher text block 14 is chained back into the circuit to become the pseudorandom vector used to encrypt the next 64-bit plain text block 10'. (In the example shown in FIG. 1b, encryption of the plain text block is performed by modulo-two addition of the pseudorandom vector with the plain text block.) This process continues for the length of the message.

To decrypt, cipher text block 14 is processed by codebook 16 and the output is modulo-two added to pseudorandom block 20 to produce a plain text block 18. Again, plain text block 18 should be identical to plain text block 10. Second cipher text block 14' is then decrypted by codebook 16 and added to the previous cipher text block (cipher text block 14) to produce plain text. The process continues until the message is complete.

In CFB (illustrated in FIG. 1c), an initialization vector (not shown) loaded into codebook 12 generates a pseudorandom vector 22 used to encrypt plain text block 10. (In the example shown in FIG. 1c, encryption of the plain text block is performed by modulo-two addition of the pseudorandom vector with the plain text block.) Cipher text block 14 is transmitted. One to sixty-four of the most significant bits of cipher text block 14 are then loaded into the least significant bits of input block 24. The contents of input block 24 is then shifted left by the same number of bits and used to generate the pseudorandom vector which is used to encrypt the next plain text block.

Meanwhile, the same initialization vector loaded into codebook 26 generates a pseudorandom vector 28 (pseudorandom vector 28 should be the same as pseudorandom vector 22). Pseudorandom vector 28 is modulo-two added to cipher text block 14 to produce plain text block 18. One to sixty-four of the most significant bits of cipher text block 14 (the same number as are used in input block 24) are then loaded into the least significant bits of input block 29. The contents of input block 29 is then shifted left by the same number of bits.

In OFB (illustrated in FIG. 1d), an initialization vector (not shown) loaded into codebook 12 generates a pseudorandom vector 22 used to encrypt plain text block 10. (In the example shown in FIG. 1d, as in FIGS. 1b and 1c, encryption of the plain text block is performed by modulo-two addition of pseudorandom vector 22 with plain text block 10 to produce cipher text block 14.) Cipher text block 14 is transmitted. One to sixty-four of the most significant bits of pseudorandom vector 22 are then loaded into the least significant bits of input block 24. The contents of input block 24 is then shifted left by the same number of bits and used to generate the pseudorandom vector which is used to encrypt the next plain text block.

Meanwhile, the same initialization vector loaded into codebook 26 generates a pseudorandom vector 28 (pseudorandom vector 28 should mirror pseudorandom vector 22). Pseudorandom vector 28 is modulo-two added to cipher text block 14 to produce plain text block 18. One to sixty-four of the most significant bits of pseudorandom vector 28 (the same number as are used in input block 24) are then loaded into the least significant bits of input block 29. The contents of input block 29 is then shifted left by the same number of bits.

According to Simmons (in *Contemporary Cryptology: The Science of Information Integrity*, published in 1992 by the Institute of Electrical and Electronics Engineers, Inc.), ECB is excellent for encrypting keys, CFB is used for encrypting characters and OFB is used to encrypt satellite communications. Both CBC and CFB can be used to authenticate data.

Packetized transfers of data create their own unique problems. Packetized data transfer protocols such as Asynchronous Transfer Mode (ATM) have been touted as critical to the efficient use of high bandwidth data transfer systems. The ATM standard is designed to support high-speed digital voice and data communication. It is expected that, by the next decade, the bulk of the voice and data traffic will be transmitted by ATM technology. To encrypt packetized data, however, the payload (information content) must be separated from the header, encrypted and then recombined with the header information to form an encrypted packet. As the data rate increases, it becomes more and more difficult to successfully encrypt the data without creating undesirable delay in transfer of the encrypted packets.

One method of encrypting packetized data is described by Stevenson et al. in "Design of a Key Agile Cryptographic System for OC-12c Rate ATM" presented at the 1995 Internet Symposium on Network and Distributed System Security. Stevenson et al. describe a DES Cipher Block Chaining (CBC) implementation based on a single high-speed cryptographic circuit (a Digital Equipment Corporation prototype rated at 1 Gbps). It is a key agile design capable of operating at 622 Mbps.

The Stevenson design reveals a problem of all such single encryption circuit approaches to date; it requires ever increasing encryption circuit clock speeds as the bandwidth of packet transfer increases. The Stevenson design must encrypt the current packet fast enough that a backlog of packets does not form. If a single cryptographic chip approach is used, the clock speed of the cryptographic chip must increase by a factor of sixteen (from 1 Gbps to 16 Gbps) in order to move from the 622 Mbps design to a 10 Gbps design. These types of increases necessitate the use of exotic and expensive hardware to support the increased throughput requirements.

Stevenson et al. teach that a key-agile encryption system is helpful in handling the myriad of destinations which can be addressed with an ATM address. In the Stevenson design key agility is achieved by limiting the number of active keys. That is, each of the possible virtual channel addresses of the ATM packet is mapped to one of 65,000 active keys. To select a key, the virtual channel address is used to select a pointer to the key associated with the virtual channel. The key pointer is then used to select the key from the active key table.

What is needed is a system and method for decoupling the encryption of one plain text block from the encryption of the next plain text block. In addition, what is needed is a system and method for the low cost scaling of the encryption and decryption processes for packetized data in order to handle increased throughput demands. Furthermore, what is needed is a system and method for providing key agility in such a system.

SUMMARY OF THE INVENTION

The present invention provides a system and method for decoupling encryption of one plain text block from the encryption of the next plain text block. Under the method, a plurality of pseudorandom vectors are precomputed. Each precomputed pseudorandom vector is used to encrypt a block of plain text. A new block of keystream is generated as part of the encryption process; that keystream block is used to generate a new pseudorandom vector.

According to one aspect of the present invention, an encryption device includes an output FIFO of depth N, a secret key codebook module and an encryption module. The output FIFO is loaded with precomputed pseudorandom vectors. Each precomputed pseudorandom vector is used to encrypt a block of plain text within the encryption module. A new block of keystream is generated as part of the encryption process and is used to generate a new pseudorandom vector. That new pseudorandom vector is then stored in the output FIFO. In one embodiment, the depth of each output FIFO is set so as to hide the latency of pseudorandom vector generation. In another embodiment, the depth of each output FIFO is set as a function of cell loss rate and key transfer times.

According to another aspect of the present invention, a plurality of encryption devices are provided. Each encryption device includes an output register for storing precomputed pseudorandom vectors, a secret key codebook module and an encryption module. Each output register is loaded with a precomputed pseudorandom vector. Plain text blocks are distributed sequentially to each encryption device and are encrypted as a function of the precomputed pseudorandom vector. A new block of keystream is generated as part of the encryption process and is used to generate a new pseudorandom vector. The new pseudorandom vector is stored in the output register of the encryption device performing the encryption process.

According to yet another aspect of the present invention, encryption apparatus can be placed in parallel to increase throughput through the encryption circuit.

According to yet another aspect of the present invention, a wide codebook module is formed by placing a plurality of encryption devices in parallel according to a predefined wide codebook dispersion algorithm. This allows the designer to take advantage of the decreasing cost of the integrated circuit encryption devices. In an embodiment useful in a packetized communication embodiment, packets for secure transfer across a link are enciphered and deciphered as a whole.

According to yet another aspect of the invention, feedback FIFOs are used to decouple generation of keystream from the enciphering and deciphering of the data. The depth of each feedback FIFO is set so as to handle the worst case burst requirements of the bulk data transfer.

According to yet another aspect of the present invention, a separate input and output FIFO is maintained for each desired keystream in order to provide key agility. The keystream to be applied to a particular block of data is then determined from the channel identifier of the data block.

BRIEF DESCRIPTION OF THE DRAWINGS

FIGS. 8a and 8b are system level block diagrams of key agile, wide codebook encryption systems constructed according to the present invention.

DETAILED DESCRIPTION OF THE PREFERRED EMBODIMENTS

Figure 1A:
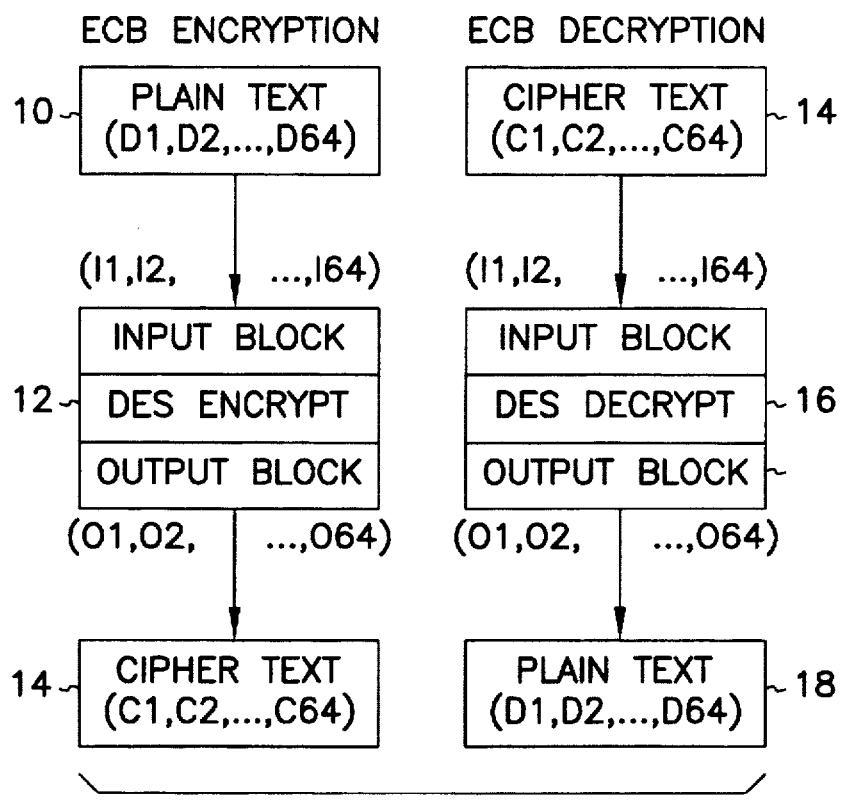
FIGS. 1a–d show the four basic modes of operation under the Data Encryption Standard.

In the following Detailed Description of the Preferred Embodiments, reference is made to the accompanying Drawings which form a part hereof, and in which are shown by way of illustration specific embodiments in which the invention may be practiced. In the Drawings, the use of the same number in different drawings indicates that the labelled elements are the same or are similar in function. It is to be understood that other embodiments may be utilized and structural changes may be made without departing from the scope of the present invention. In particular, it should be realized that although the embodiments shown apply 64 bit and 128 bit secret key algorithms, the invention can be used with secret key algorithms of any block width. In addition, for reasons of illustration, embodiments of the invention as they apply to an ATM network implementation have been provided. It should be obvious that the described invention can be used to provide scalable and/or key agile cryptography to any bulk data transfer performed with secret key encryption.

Figure 1B:
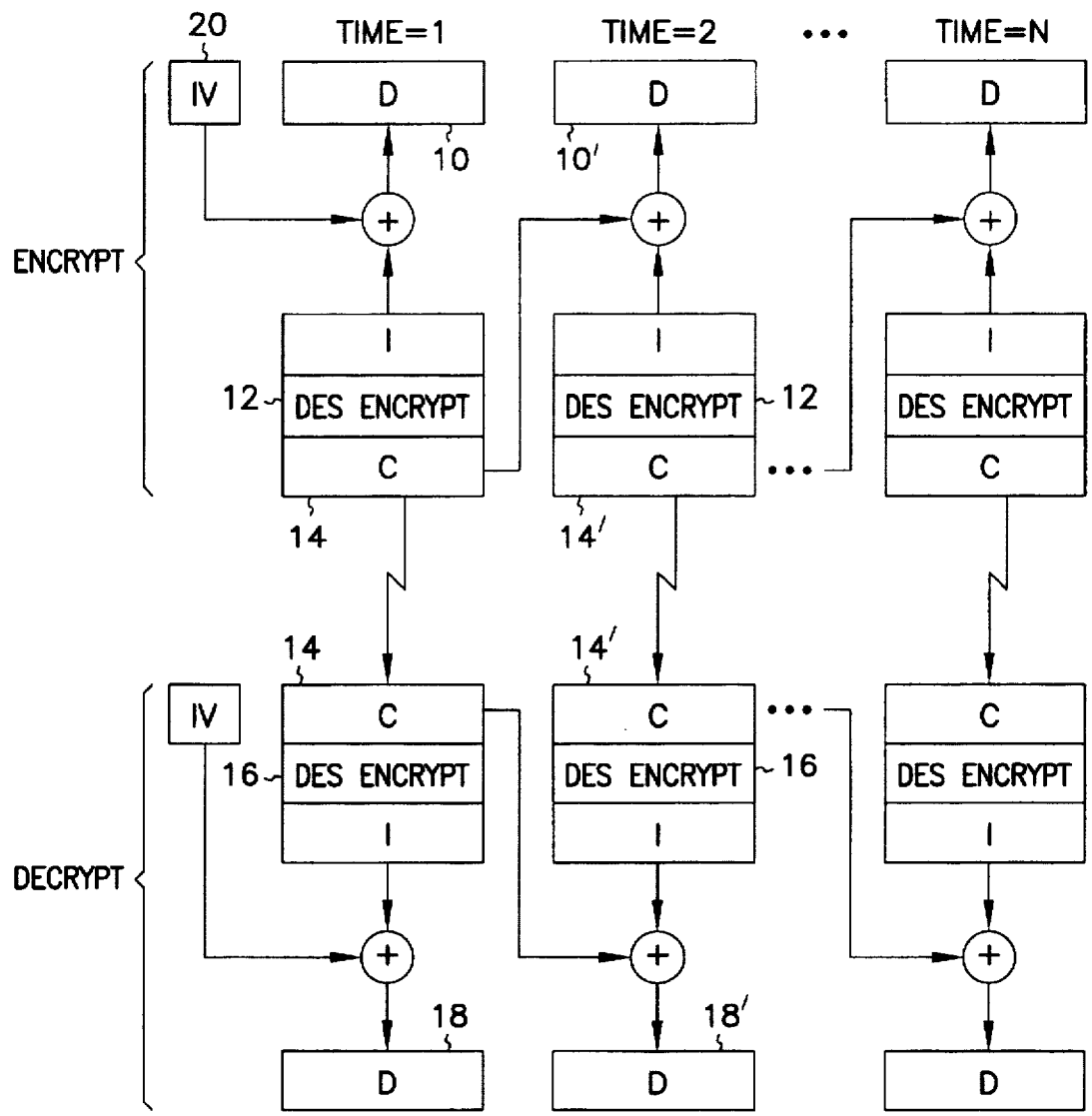
Figure 1C:
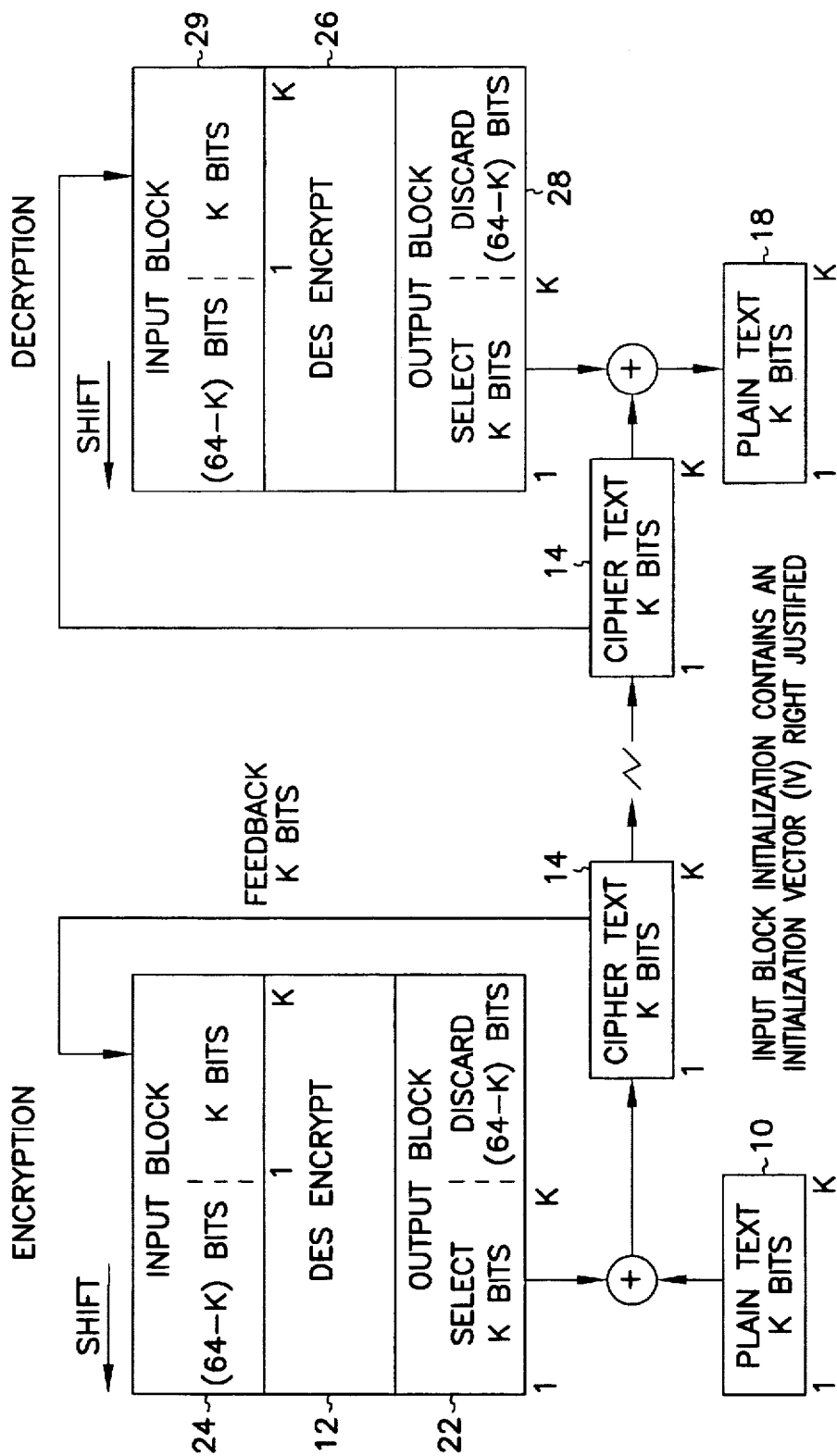
Figure 1D:
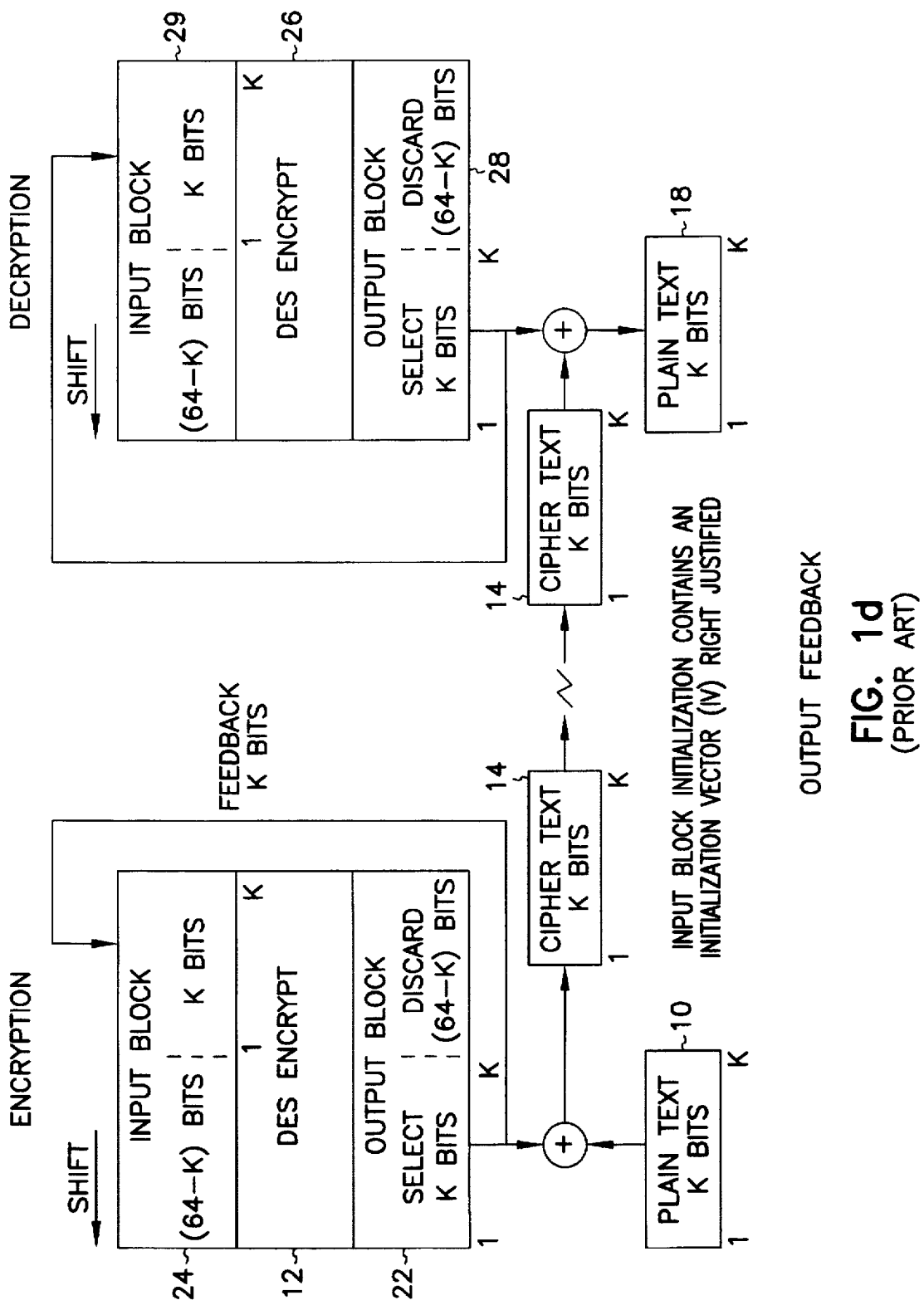

Traditional cryptographic modes (e.g., the cipher block chaining, cipher feedback and output feedback modes of FIGS. 1b–d, respectively) provide a mechanism for feeding bits used in the encryption process into the codebook (see, e.g. codebook 12 of FIGS. 1b–1d) in order to generate the pseudorandom vector used to encrypt the next plain text block. This feedback mechanism usually takes the form of a feedback register; typically, the size of the feedback register is equal to the size of the encryption algorithm. For example, the feedback register for DES cipher block chaining is 8 bytes.

The effect of making the feedback register equal in size to the width of the encryption algorithm is that the codebook input for iteration N+1 is a function of the encryption algorithm output of iteration N (i.e., iteration N+1 cannot start until iteration N is completed). Thus, the encryption algorithm is forced to encrypt blocks N and N+1 sequentially. This sequential processing prevents cryptographic equipment from taking advantage of multiprocessor techniques for increasing throughput. In essence, the entire encryption process must be performed by a single encryption algorithm device. The throughput of the encryption equipment is therefore limited to the throughput of the single encryption algorithm device (see e.g., Stevenson et al., above).

The multiplexed cryptographic modes discussed hereinafter overcome this limitation and allow multiple encryption algorithm devices to be used in a multiprocessor fashion to improve throughput. This is achieved by increasing the depth (size) of the feedback register to a multiple of the width of the encryption algorithm. Cryptographic modes which employ a cryptographic algorithm output (pseudorandom vector) register (e.g., cipher feedback and output feedback) also have the output register increased to the same depth as the feedback register. The feedback and output registers become, in effect, a First In First Out (FIFO) memory in which each entry is as wide as the encryption algorithm. The depth of each FIFO memory is at least two entries deep.

Figure 2B:
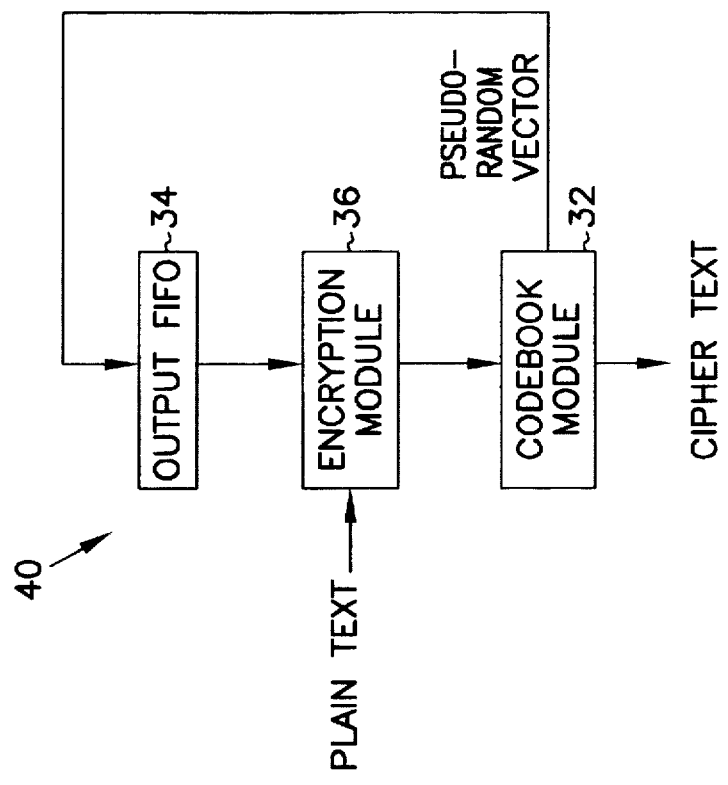
FIGS. 2a and 2b are top level diagrams of two embodiments of encryption systems constructed according to the present invention.
Figure 2A:
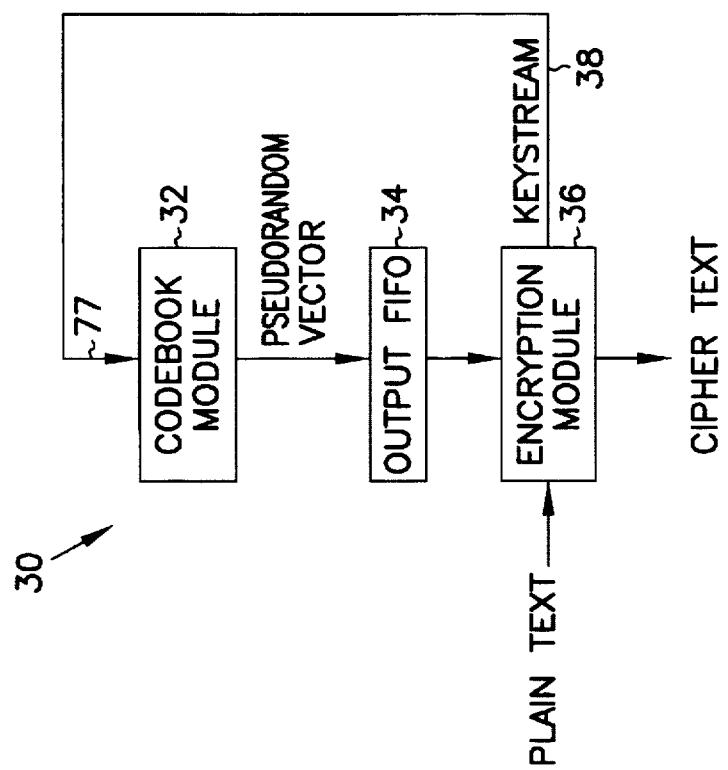

FIGS. 2a and 2b are top level diagrams of encryption devices constructed according to the present invention. In FIG. 2a, encryption device 30 includes a codebook module 32, an output FIFO module 34 and an encryption module 36. Pseudorandom vectors generated by codebook module 32 are stored in output FIFO module 34 until the next plain text block of data arrives. When a plain text block arrives at encryption circuit 30, the oldest pseudorandom vector stored in output FIFO module 34 is read out of module 34 and used to encrypt the plain text block. This encryption process transforms the plain text block into a cipher text block. The cipher text block is transmitted and data is sent from encryption module 36 to codebook module 32 in order to generate a new pseudorandom vector. In one embodiment, the encryption process used in encryption module 36 is modulo-two addition of the pseudorandom vector to the plain text block. In another embodiment, the encryption process used in encryption module 36 is a substitution box which uses the pseudorandom vector and the plain text block as input to a look up table containing the desired cipher text substitutions.

In one embodiment, the data sent from encryption module 36 to codebook module 32 is the cipher text block (e.g., cipher feedback mode). In another embodiment, the data sent from encryption module 36 to codebook module 32 is the pseudorandom vector used to encrypt the cipher text block (e.g., output feedback mode).

In FIG. 2b, encryption device 40 includes a codebook module 32, an output FIFO module 34 and an encryption module 36. Again, pseudorandom vectors generated by codebook module 32 are stored in output FIFO module 34 until the next plain text block of data arrives. When a plain text block arrives at encryption circuit 40, the oldest pseudorandom vector stored in output FIFO module 34 is read out of module 34 and used to encrypt the plain text block. This encryption process transforms the plain text block into a cipher text block. The cipher text block is transmitted and data is sent from encryption module 36 to codebook module 32 in order to generate a new pseudorandom vector.

In one embodiment, the data sent from encryption module 36 to codebook module 32 is the cipher text block (e.g., cipher block chaining).

In FIGS. 2a and 2b, output FIFO module 34 decouples the generation of keystream in connection with one block of data from the use of keystream in encrypting the next block of data. By precomputing two or more pseudorandom vectors and placing them in output FIFO module 34, the encryption of each plain text block can occur as needed. In one embodiment output FIFO module 34 has a FIFO memory depth of N, where N is a function of the desired throughput (transfers per clock period) and the latency of encryption device 30 or 40 (in clock periods). (For these purposes, the latency of encryption device 30 or 40 is the amount of time between receipt of a plain text block and the availability in the output FIFO module 34 of the pseudorandom vector generated in conjunction with that plain text block. For instance, in a system where it takes N clock periods to compute a new pseudorandom vector and which is supposed to encrypt incoming plain text blocks at a rate of once every two clock periods, the depth of output FIFO module 34 must be at least N/2. If latency is N clock periods and the system is supposed to handle a peak transfer rate of one block per clock period, a depth of at least N is needed. In a packet environment like ATM, other factors such as cell loss rates and key transfer times may be considered while determining N.

Figure 3A:
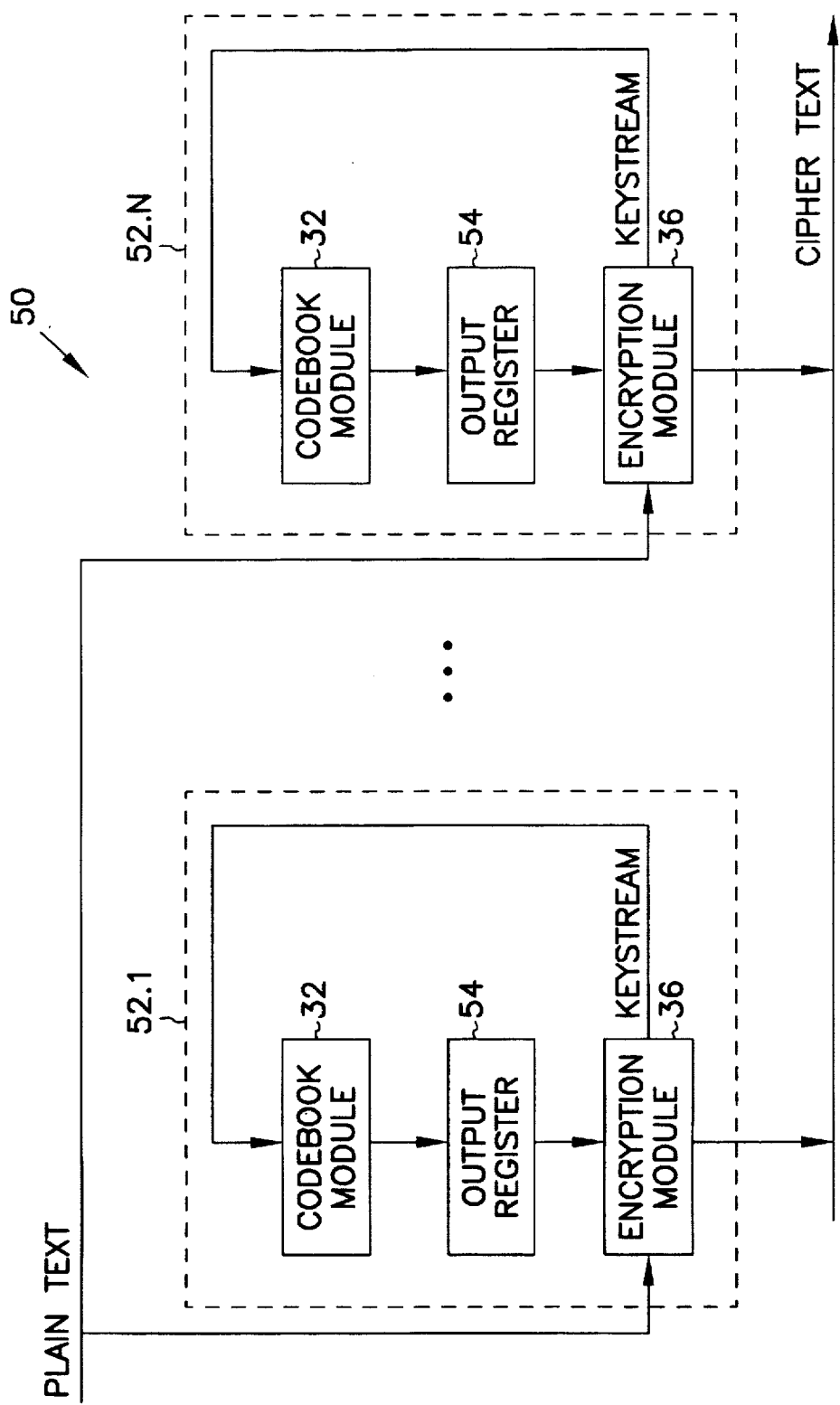
FIGS. 3a and 3b are top level diagrams of logical equivalents of the encryption systems of FIGS. 2a and 2b, respectively.
Figure 3B:
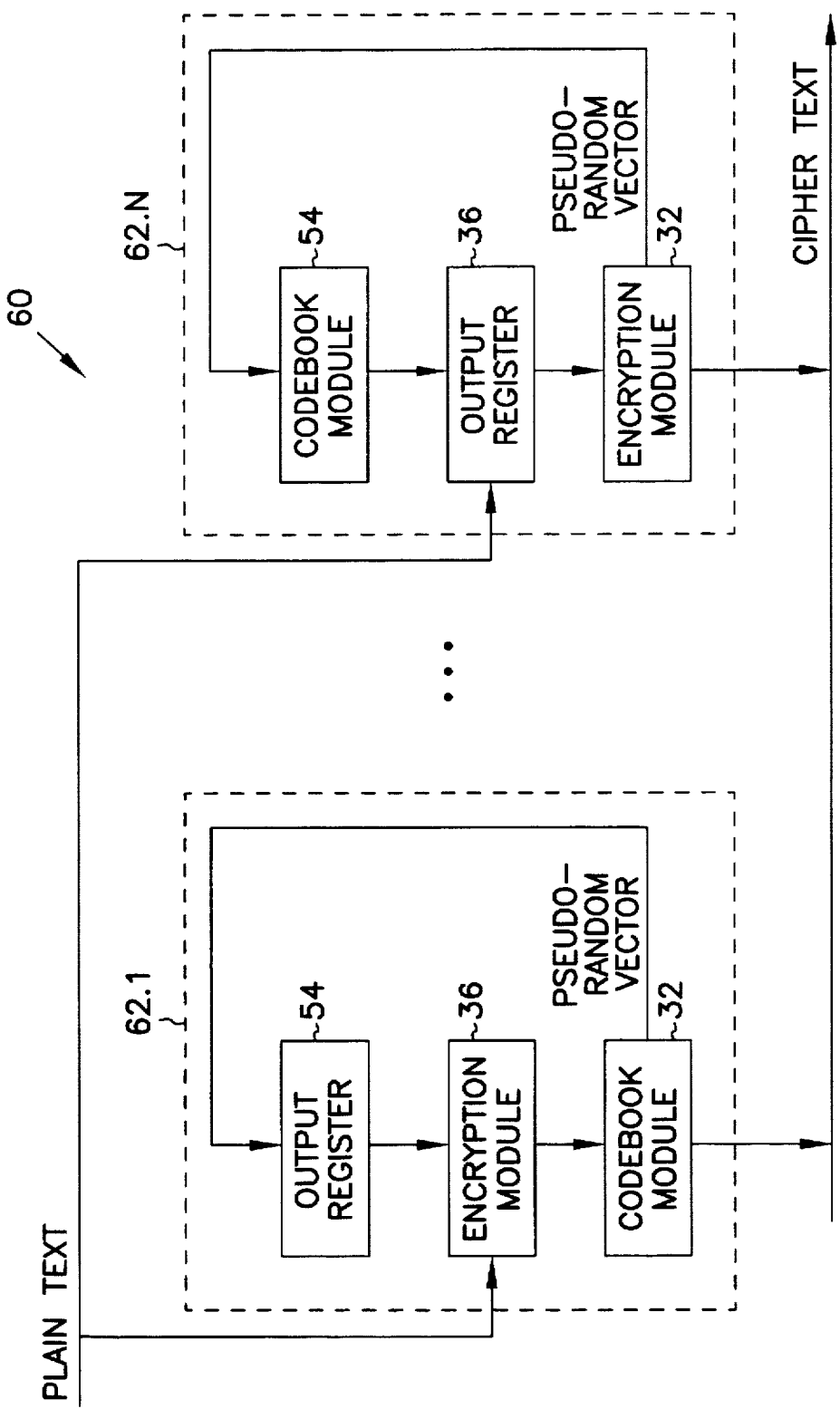

This same decoupling effect can be seen in the circuits of FIGS. 3a and 3b. In FIG. 3a, encryption device 50 includes N instances of encryption device modules 52 (shown as 52.1 through 52.N). Each encryption device module 52 includes a codebook module 32, an output register 54, and an encryption module 36. In operation successive plain text blocks are distributed to adjacent encryption device modules 52. Operation within each encryption device module 52 is similar to that of encryption device 30.

Likewise, in FIG. 3b, encryption device 60 includes N instances of encryption device modules 62 (shown as 62.1 through 62.N). Each encryption device module 62 includes an output register 64, a codebook module 32 and an encryption module 36. Operation within each encryption device module 62 is similar to that of encryption device 40.

Figure 4:
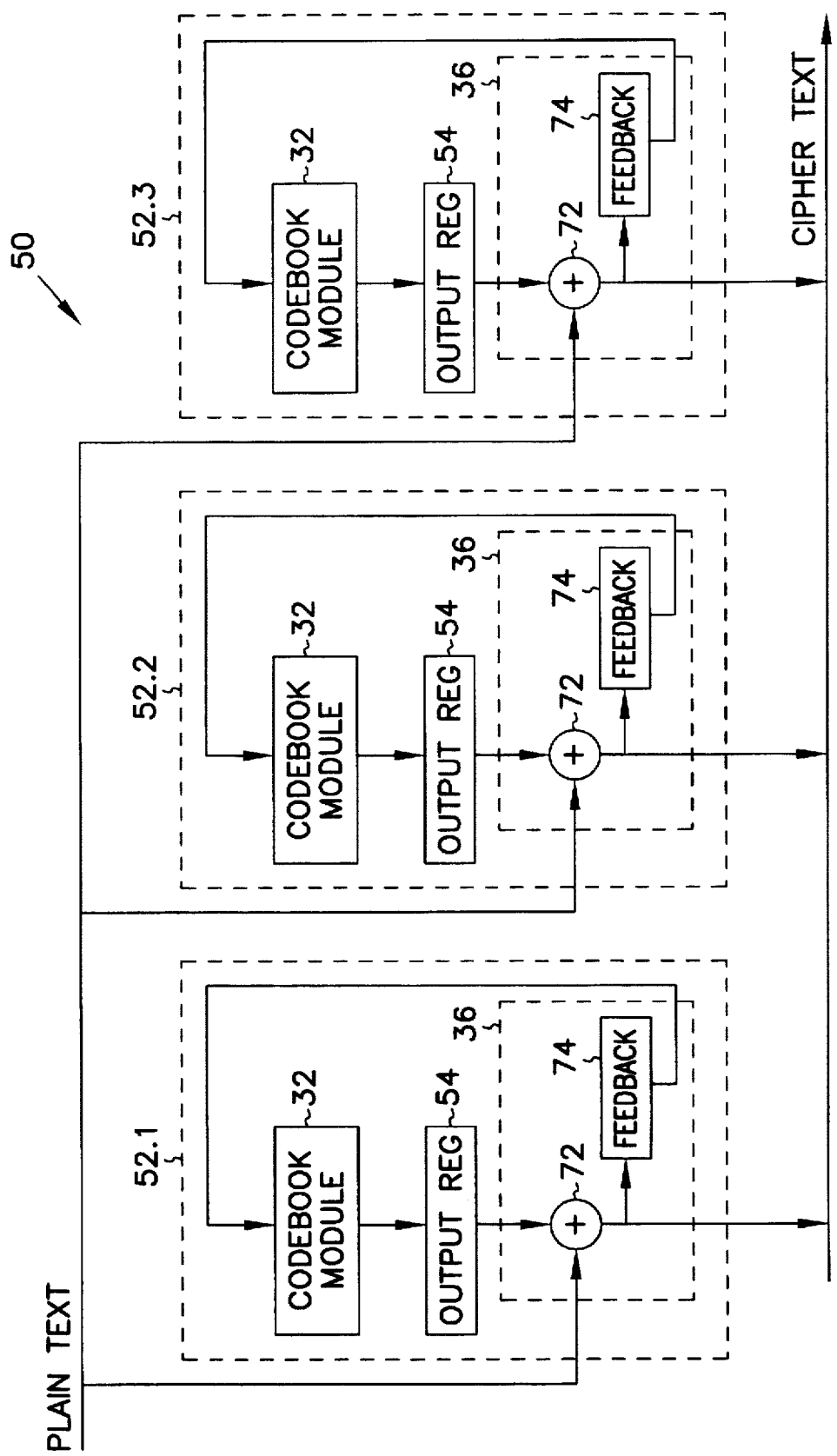
FIG. 4 is a system level block diagram of a three encryption module embodiment of a cipher feedback mode encryption system constructed according to the present invention.

As an example, consider the cipher feedback mode embodiment shown in FIG. 4. The mode shown uses three encryption device modules 52.1–3. Each encryption device module 52 includes a codebook module 32, an output register 54, and an encryption module 36. Each encryption module 36 includes a modulo-two adder 72 and a feedback register 74. In one embodiment, codebook module 32 implements the eight byte DES algorithm.

In operation, the cipher text block generated at iteration N is used to generate the pseudorandom vector used for iteration N+3. Therefore, an encryption algorithm device can begin generating the pseudorandom vector to be used in iteration N+3 before encryption of plain text blocks N+1 and N+2 has completed. The encryption algorithm no longer is dependent on the output of the immediately preceding block. This allows multiple encryption devices to operate on successive plain text blocks independently. In the example shown in FIG. 4, up to three encryption device modules 52 could be used in multiprocessor fashion to increase the throughput by a factor of three. That is, all three encryption modules 36 could be encrypting their respective plain text blocks at the same time. Likewise, all three codebook modules 32 could be calculating the pseudorandom vector they will use on their next assigned plain text block at the same time.

Figure 5:
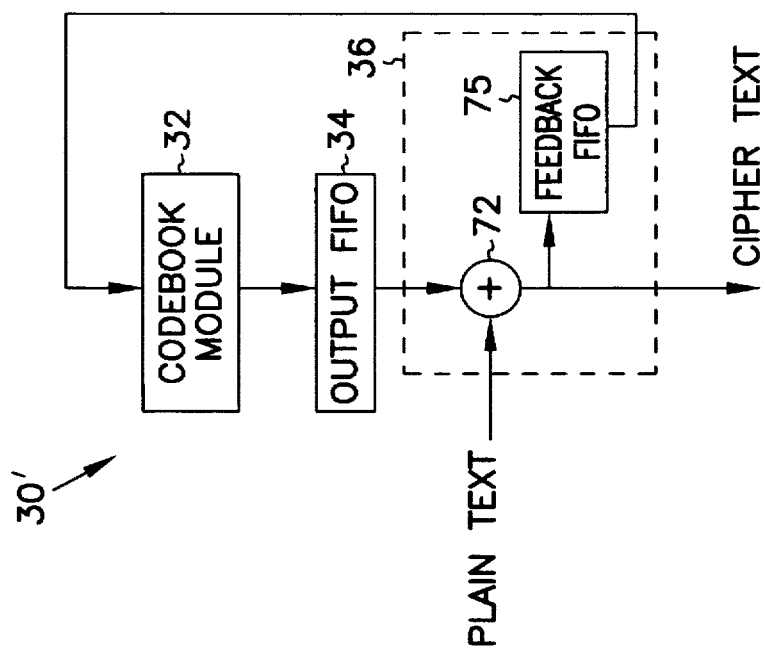
FIG. 5 is a system level block diagram of a logical equivalent of the encryption system of FIG. 4.

It should be apparent that FIGS. 2a and 3a are logical equivalents. In the same way, FIGS. 2b and 3b are logical equivalents. This means that, given sufficiently fast circuitry, all computations performed in the device of FIG. 4 can be performed within a single encryption device 30 such as is shown in FIG. 2a in a manner which is equivalent to that described above. To do this, output FIFO module 34 (and the FIFO equivalent of feedback register 74 of encryption module 36 (if necessary)) must have a depth of three. A FIFO depth of three creates three virtual encryption module devices within the one encryption device 30. That is, the three encryption device modules 52.1-3 in FIG. 4 become three logical encryption device modules mapped onto encryption device 30 in FIG. 2a. One such implementation is shown in FIG. 5 where both output FIFO module 34 and feedback FIFO module 75 include a FIFO memory which is three 8 byte wide entries deep. Note that it is important that the sender (encryptor) and receiver (decryptor) maintain the same FIFO depth in order to maintain cryptographic synchrony.

The number of logical encryption devices available may be increased by adding more physical devices (i.e., by adding mode encryption device modules 52 in parallel), by increasing the depth of output FIFO module 34 and feedback FIFO module 75 (if needed) (i.e., by increasing the depth of output FIFO module 34 and feedback FIFO module 75 or by a combination of the two approaches. It should be noted, however, that the number of codebook modules 32 does not need to be equal to the number of logical encryption algorithm devices. For instance, if the number of logical encryption devices equals eight (i.e., N=8), an encryption circuit implementing N=8 could be designed using anywhere from one to eight physical encryption device modules. An encryption device implemented using eight encryption device modules 52 is cryptographically compatible with one which implements eight logical encryption devices on a single encryption device 30. Similarly, an encryption device implemented using eight encryption devices 30 can be made cryptographically compatible with one which implements eight logical encryption algorithm devices on two encryption devices 30 (that is, if the physical devices are configured to implement four logical encryption algorithm devices).

The basic multiplexed encryption device will provide N memory locations. These memory locations can be implemented as output registers (such as registers 54 of FIG. 4), as an output FIFO (such as FIFO 34 of FIG. 5) or as multiple output FIFOs (such as could be formed by placing two circuits 30' in FIG. 5 in parallel). Precomputed pseudorandom vectors are placed in each of the N memory locations and each plain text block is encrypted as a function f( ) of the plain text block and the pseudorandom vector calculated N iterations earlier. (For the first N plain text blocks the precomputed pseudorandom vectors are used in this encryption process.) A new pseudorandom vector is then calculated as a function g( ) of the current pseudorandom vector (i.e. the pseudorandom vector calculated during iteration i-N). The new pseudorandom vector is then stored in one of the N memory locations.

In one class of embodiments, the function f( ) is modulo-two addition of the pseudorandom vector to the plain text block (e.g., cipher feedback and output feedback modes). That is:

$$CT(i)=PT(i) \oplus PV(i-N)$$

where CT(i) is the cipher text block for iteration i; PT(i) is the plain text block for iteration i and PV(i-N) is the pseudorandom vector calculated during iteration i-N.

In another class of embodiments, the function f( ) is modulo-two addition of the pseudorandom vector to the plain text block, followed by secret key encryption of the result (e.g., cipher block chaining mode). That is:

$$CT(i)=K(PT(i) \oplus PV(i-N))$$

where K is a secret key encryption function.

In one class of embodiments, the function g( ) is secret key encryption of the current pseudorandom vector (e.g., output feedback mode). For output feedback mode, $$PV(i)=K(PV(i)).$$

here K is a secret key encryption function.

In another class of embodiments, the function g( ) is secret key encryption of the cipher text block calculated in that iteration (e.g., cipher feedback mode). For cipher feedback mode, $$PV(i)=K(CT(i)).$$

In yet another embodiment, the function g( ) is secret key encryption of the modulo-two addition of the current pseudorandom vector and the plain text block being encrypted (e.g., cipher block chaining mode). For cipher block chaining, $$PV(i)=K(PT(i) \oplus CT(i-N))$$

where CT(i-N)=PV(i-N).

Figure 6:
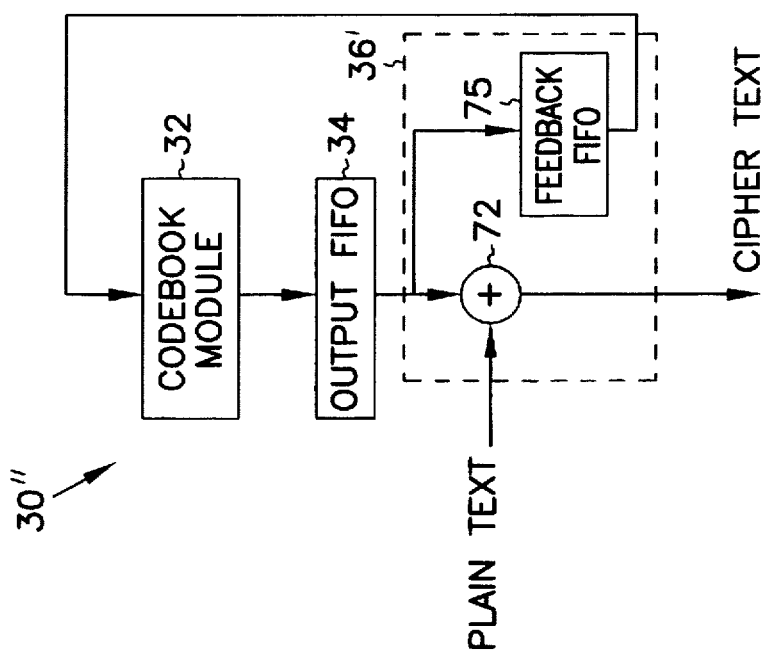
FIG. 6 is a system level block diagram of an output feedback mode encryption system constructed according to the present invention.
Figure 7A:
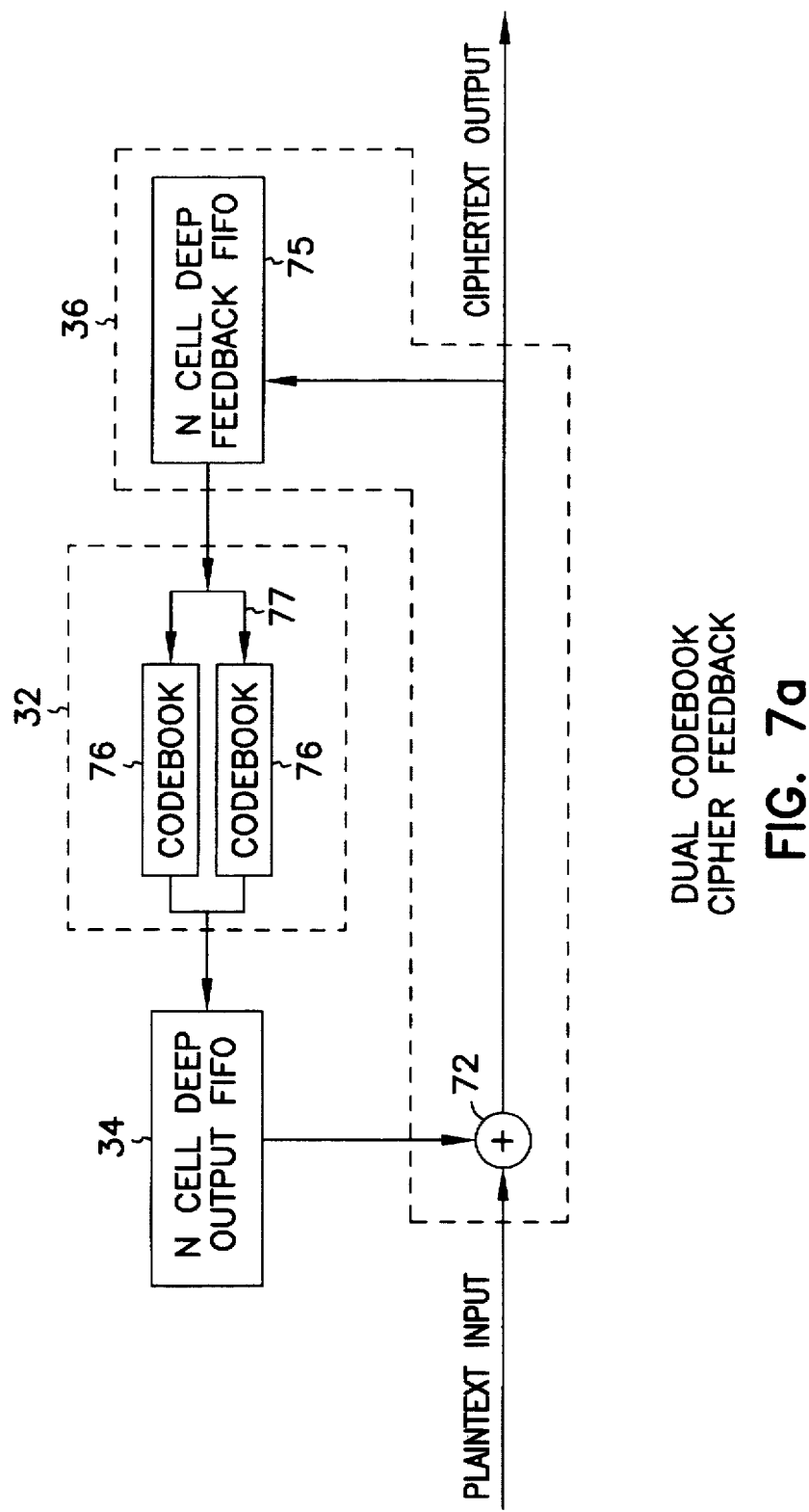
FIG. 7a is a system level block diagram of a two codebook cipher feedback mode encryption system constructed according to the present invention.
Figure 7B:
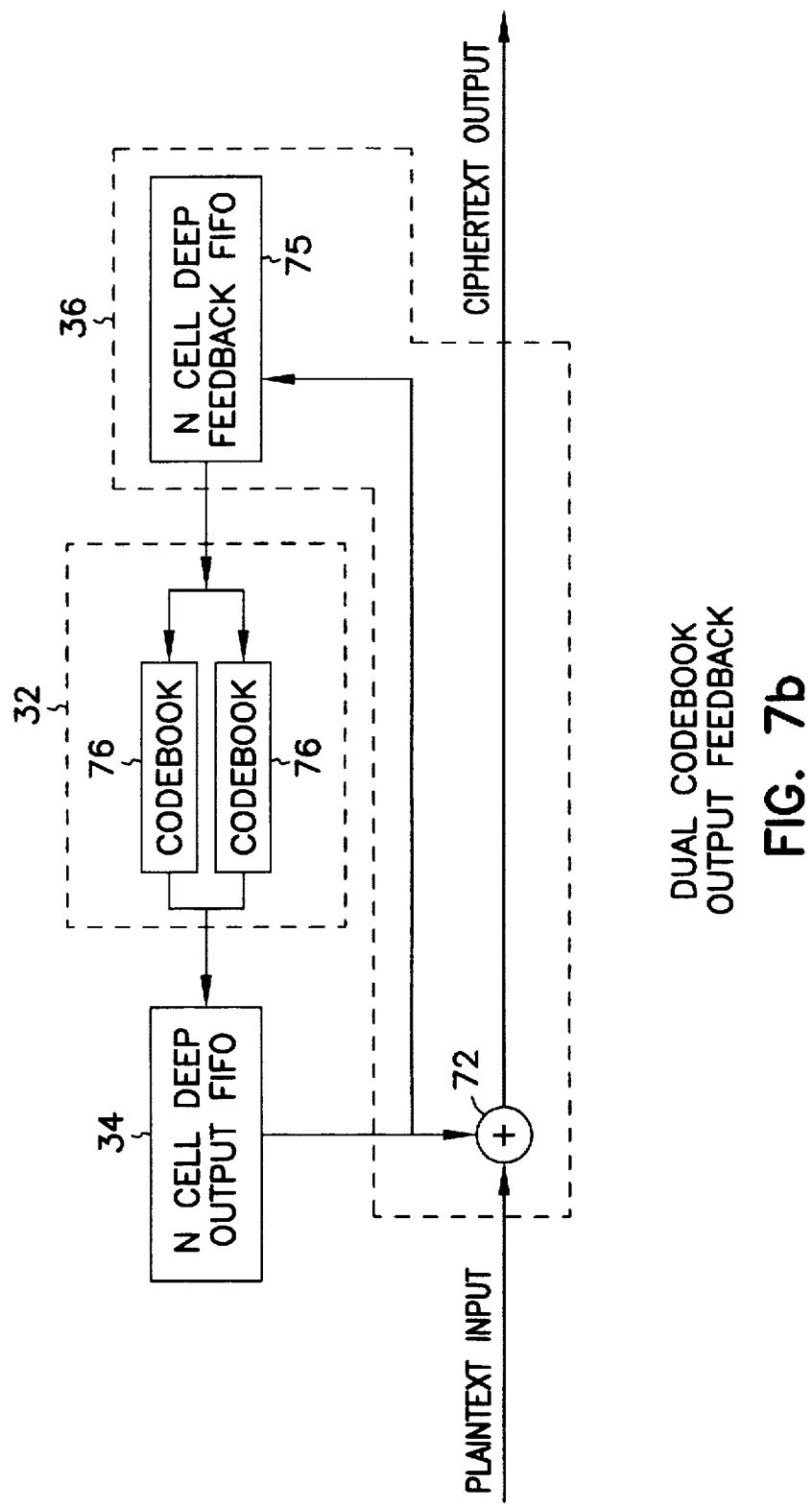
FIG. 7b is a system level block diagram of a two codebook output feedback mode encryption system constructed according to the present invention.
Figure 7C:
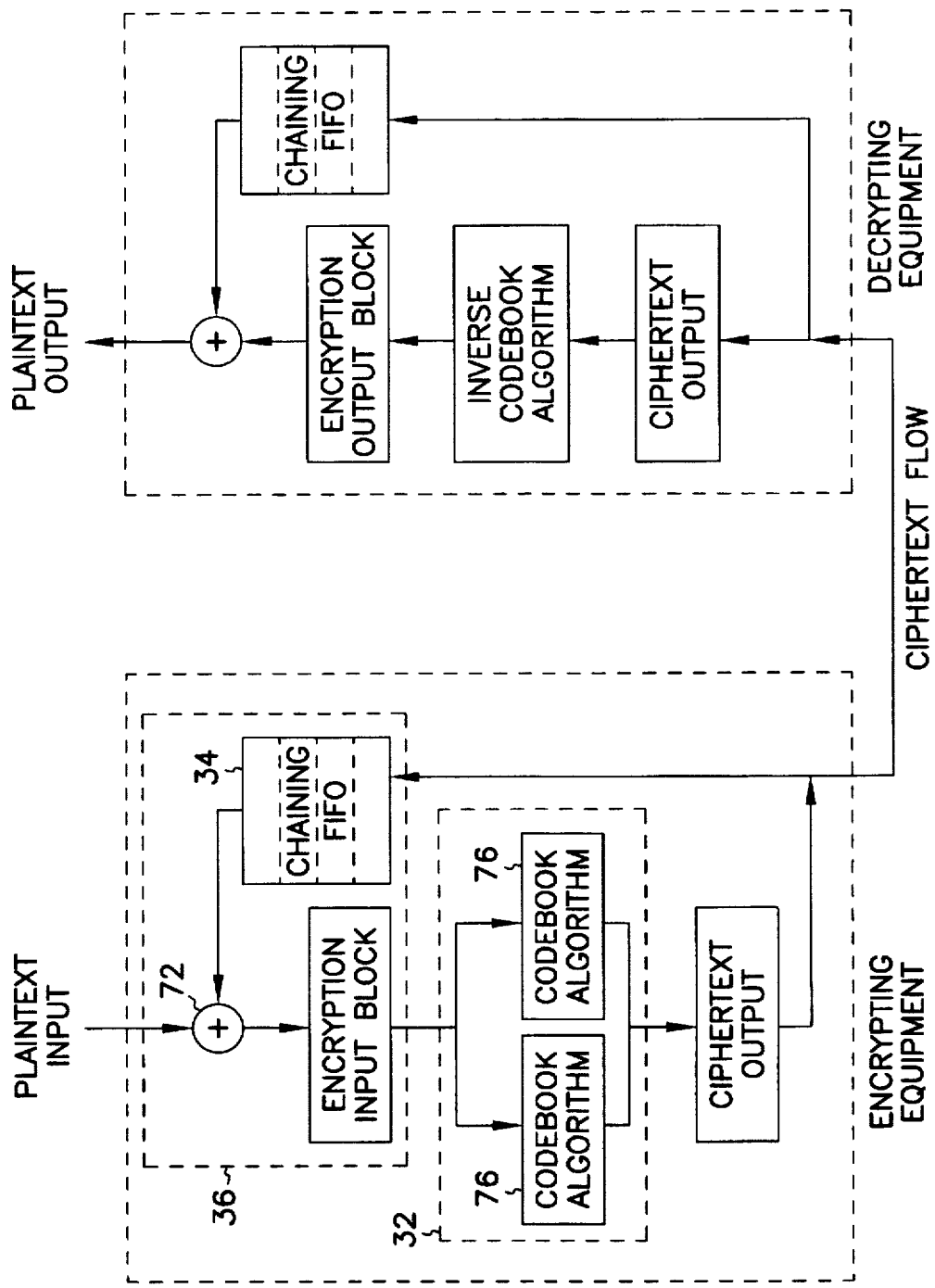
FIG. 7c is a system level block diagram of a two codebook cipher block chaining mode encryption system constructed according to the present invention.

It should be clear that although this multiplexing technique described in terms of DES modes, it is not limited to any particular cryptographic algorithm. It can be applied to many other secret key implementations, including SKIPJACK. For example, FIG. 6 shows a FIFO based implementation of multiplexed output feedback mode according to the present invention. Likewise, a multiplexed cipher block chaining implementation could be implemented by including a feedback FIFO memory in encryption module 36 in FIG. 2b. Such an embodiment is illustrated in FIG. 7c, where feedback FIFO module 75 includes a chaining FIFO used to store cipher text blocks so they can be used to encrypt new plain text blocks. The encrypted plain text blocks are then encrypted via a secret key algorithm executed in codebook module 32.

Multiple Codebooks

The FIFO based approach to encryption provides other advantages as well. As can be seen in FIGS. 7a–7c, the use of FIFOs provides a buffer such that more than one codebook 76 can be used in parallel within codebook module 32. FIG. 7a shows a cipher feedback mode implementation in which two codebooks 76 are placed in parallel within codebook module 32. Keystream data transferred from feedback FIFO feedback module 75 in encryption module 36 is placed alternately in first one codebook 76 and then the other codebook 76. In once such embodiment, each codebook 76 implements the 8 byte wide DES algorithm; as a result, two 64 bit pseudorandom vectors can be generated in the time that it typically would take to generate one pseudorandom vector. Such an approach is shown for cipher block chaining in FIG.7c. It should be recognized that the encryption circuitry and the decryption circuitry shown in FIG. 7c are cryptographically compatible even though the number of encryption algorithm devices used within each differs.

FIG. 7b shows an output feedback mode implementation of the circuit of FIG. 7a.

Application of Multiplexing to a Secure ATM System

An application of these multiplexing techniques will now be described for a secure ATM system. This exercise is not intended to limit the scope of the invention to ATM systems but instead is intended to illustrate application of the above techniques to a known system.

Figure 9:
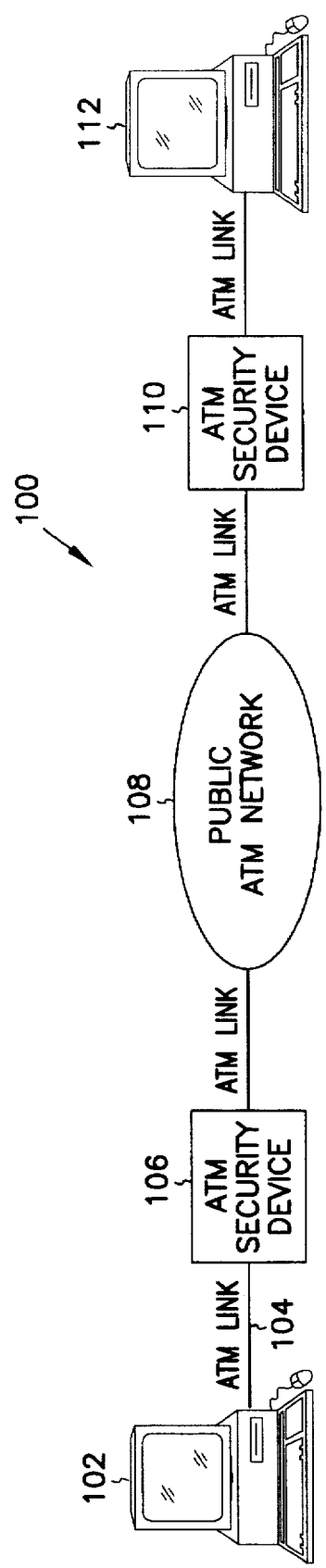
FIG. 9 is a system level block diagram of a secure ATM system.

A secure ATM system 100 is shown in FIG. 9. An input device 102 (such as a workstation or videoconferencing system) is connected over an ATM link to an ATM security device 106. ATM security device 106 is in turn connected over public ATM network 108 to a second ATM security device 10, which is connected over an ATM link 114 to a device 112 (such as a workstation or videoconferencing system). ATM security device 106, 110 contain cryptographic hardware which encrypts data to be sent across network 108 and decrypts data received over network 108. Devices 106 and 110 can also contain ATM combiner hardware (not shown) for combining multiple streams of ATM packets before encrypting each individual stream of packets. Devices 106 and 110 allow unsecured commercially available equipment to communicate securely across a public network 108.

In the system of FIG. 9, data encryption is performed on a cell by cell basis for virtual circuits which have established secure ATM connections. ATM is based on a fixed-size virtual circuit-oriented packet consisting of 53 bytes (five bytes of header information and a 48-byte information field). The header field contains control information critical to the routing of the packet. All traffic on an ATM network is broken into these 53-byte cells.

In the system of FIG. 9, devices 106 and 110 exchange cryptographic identities and negotiate security services when establishing the ATM connection. They then provide ATM speed encryption and decryption for the devices they connect to ATM network 108. The only protocol overhead after the secure connection has been established is synchronization information and the input devices such as devices 102 and 112 need not be aware that cryptographic services are being provided. (In one embodiment, cells arriving on virtual circuits for which no secure ATM connection has been established will be dropped.)

Figure 10:
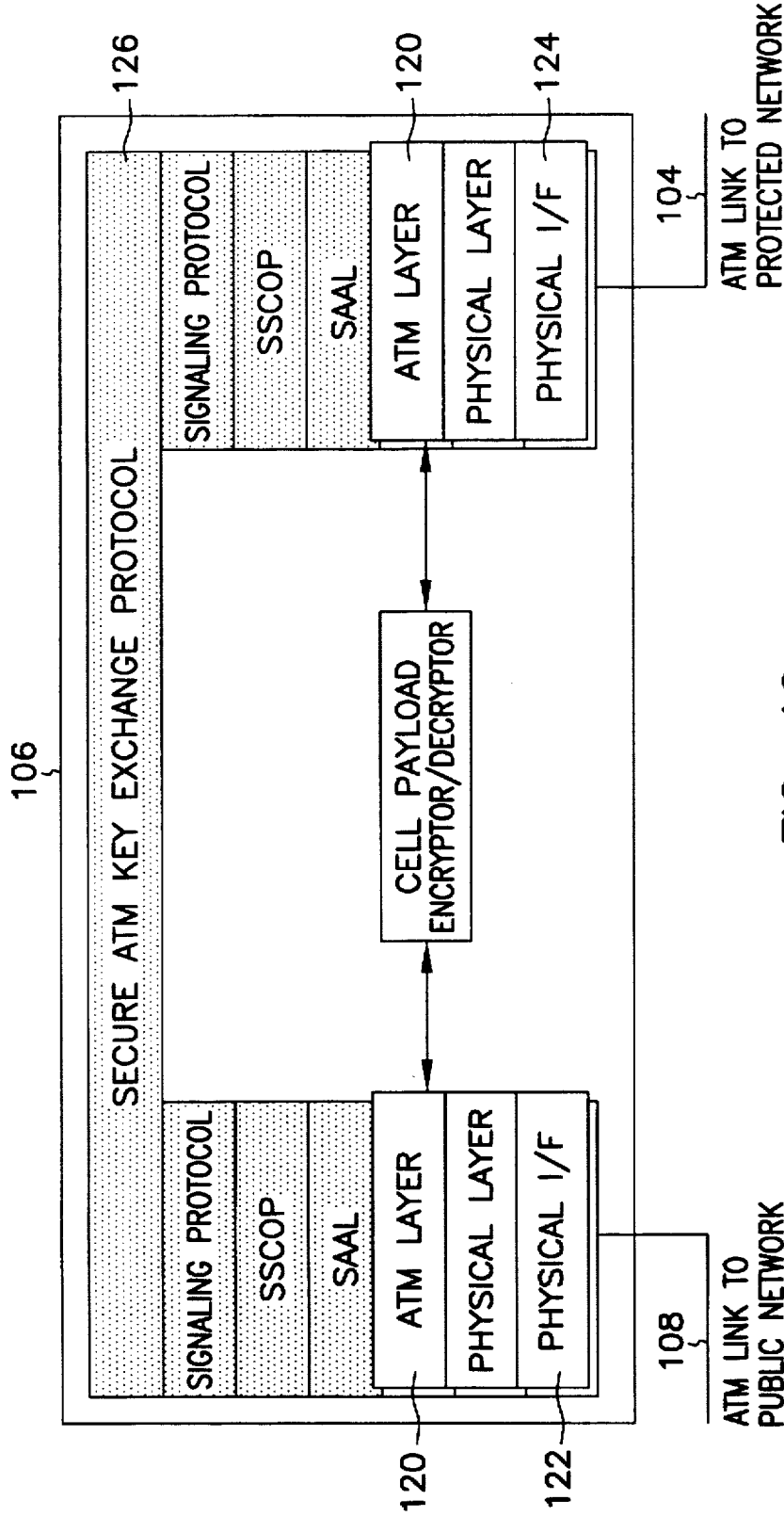
FIG. 10 is an illustration of an ATM security device architecture which can be used in the secure ATM system of FIG. 9.

An ATM key exchange protocol is used in devices 106 and 110. Operation of such a protocol will be described with reference to FIG. 10. (Since devices 106 and 110 are symmetric, only device 106 is shown in FIG. 10.) As can be seen in FIG. 10, in this embodiment payload encryption/decryption is performed at ATM layer 120. Security device 106 has two physical interfaces (122, 124). Physical interface 122 connects to ATM network 108 while physical interface 124 connects to ATM link 104. Device 106 processes ATM cells arriving at both interfaces. Cells arriving on the signalling channel are treated as ATM connection setup messages. These messages are directed up the protocol stack to secure key exchange protocol module 126 for processing. ATM cells arriving on non-signalling channels (for establishing connections) from the protected network are passed to the ATM layer for encryption prior to transmission on the link to public network 108. Conversely, ATM cells arriving on non-signalling channels from public network 108 are passed to the ATM layer for decryption prior to transmission as plain text on link 104 to workstation 102.

In one embodiment, device 106 maintains information about a connection setup request for use in subsequent connection setup or release processing. Subsequent to ATM connection setup with a peer device (such as device 110), protocol exchanges occur between devices 106 to exchange cryptographic keys and negotiate security services to setup a secure ATM connection. Once the ATM connection is made, however, ATM cells flowing through device 106 come up only as far as ATM layer 120 before being encrypted or decrypted and sent out the appropriate interface.

Device 106 must be able to operate in a manner which is invisible to the network. Undue delay in encrypting or decrypting packets can cause noticeable problems in voice communication. To avoid this, in one embodiment device 106 employs a multiplexed cipher feedback mode model such as is shown logically in FIG. 11a. The multiplexed cipher feedback model may be used with codebooks of any width. Thus it can be used with 64 bit wide algorithms such as DES. But, more importantly, it can also be used with 128 bit wide algorithms or with the wide codebook to be described below. The first implementations are expected to use a 48 byte wide codebook.

Figure 11A:
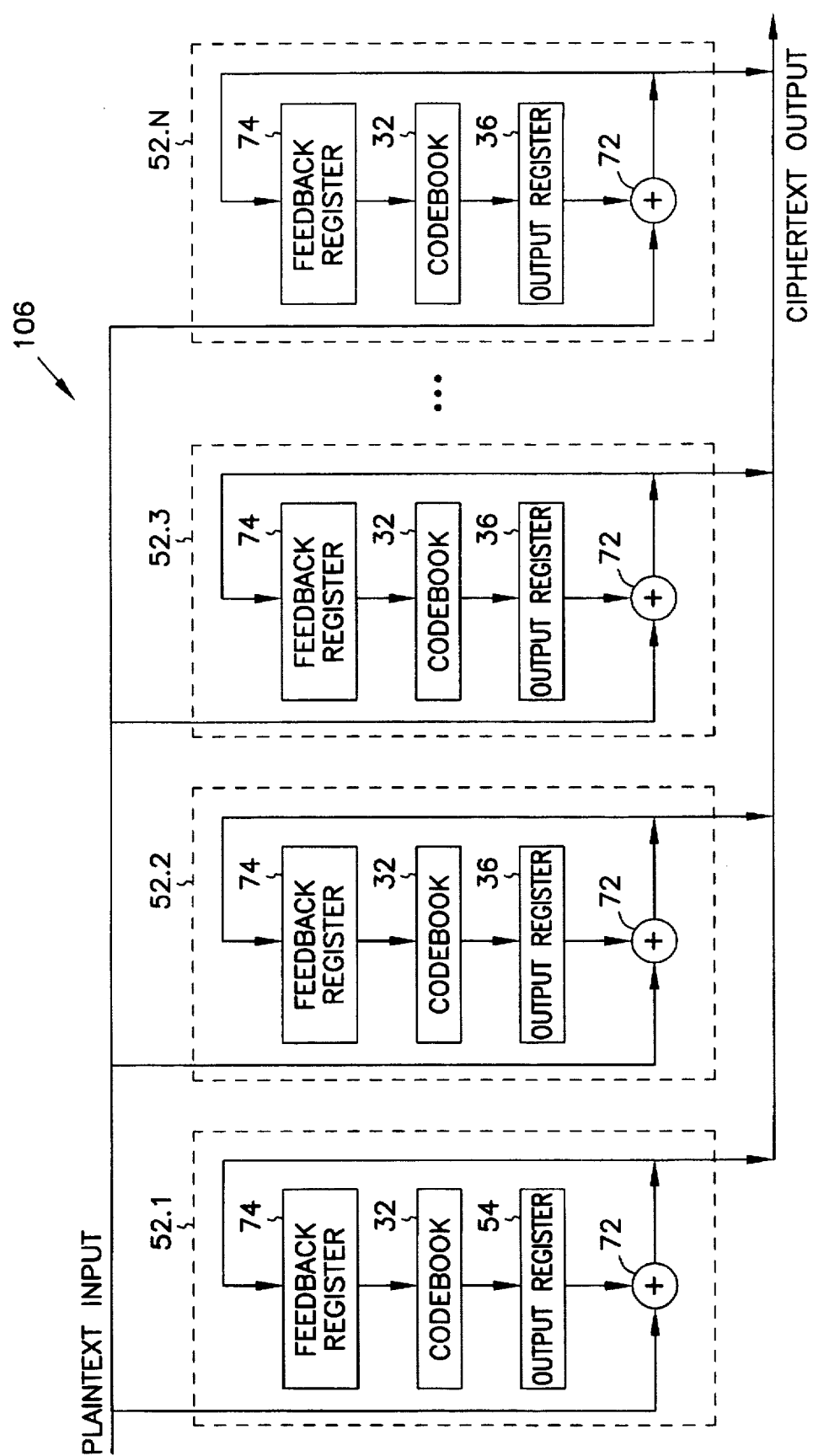
FIG. 11a is a logical representation of a multiplexed cipher feedback mode model.

The logical model of the multiplexed cipher feedback mode, shown in FIG. 11a, shows that up to an integer N number of encryption device modules 52.1–N may be linked together. As described above, the number of encryption device modules in a particular design is based on engineering factors such as the cell loss rate and the time required to change the cryptographic key in the encryption algorithm devices which make up codebook module 32. Encryption device modules 52.1–N implement a standard cryptographic mode (in this embodiment, cipher feedback) defined by the U.S. Government for the DES algorithm. Multiplexed cipher feedback mode refers to any implementation with two or more logical encryption device modules. In another embodiment, an output feedback mode can be transformed via the above techniques into a multiplexed output feedback mode. Such a mode is shown in FIG. 11b.

Figure 11B:
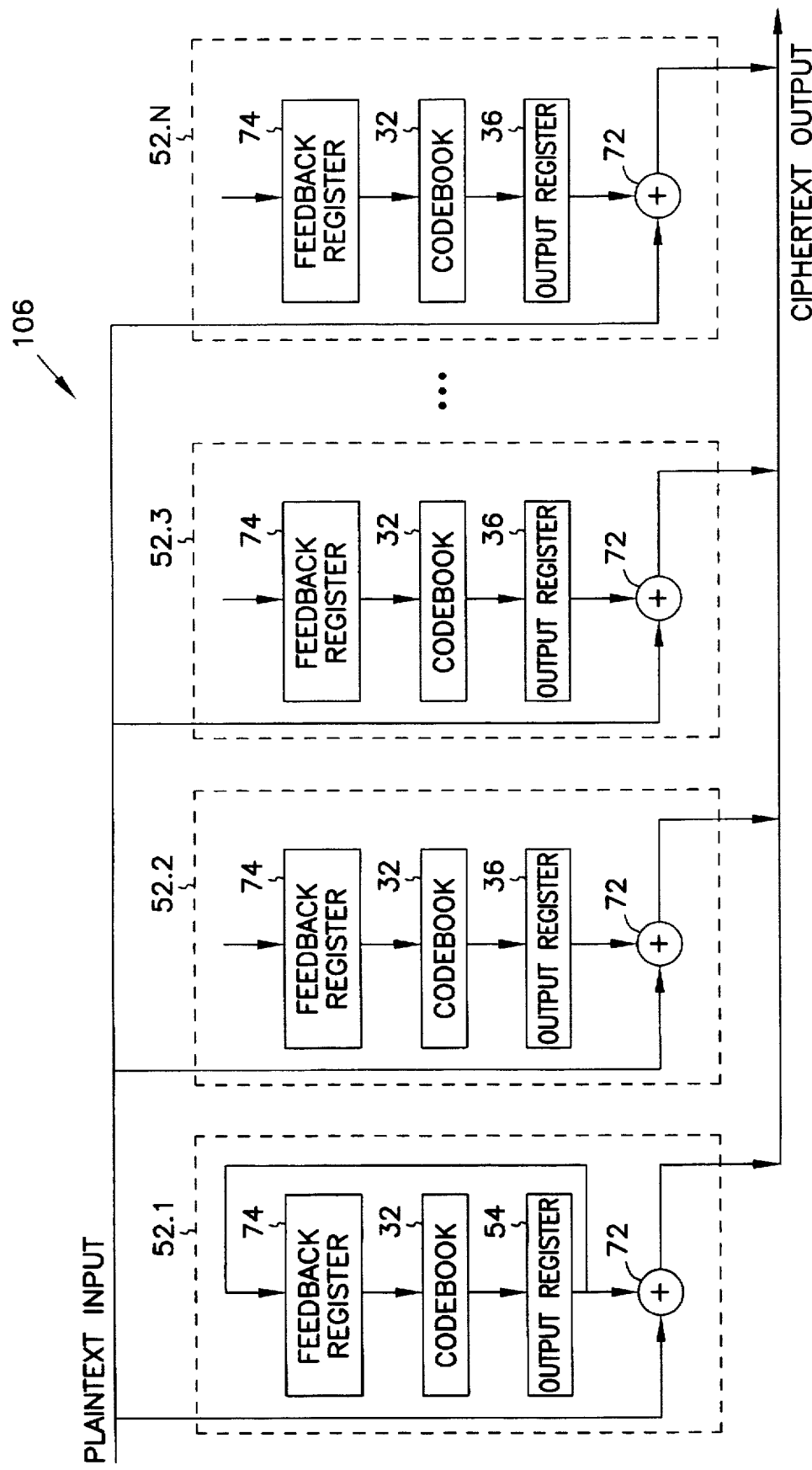
FIG. 11b is a logical representation of a multiplexed output feedback mode model.

The encryption circuits of FIG. 11a and 11b operate by distributing consecutive plain text ATM cells across the available encryption device modules 52.1–N. The plain text input is broken up into cells which are the same width as codebook 32; the cells are input to modules 52.1–N in a round robin fashion. As an example, assume the multiplexed cipher feedback device in FIG. 11a had four encryption device modules 52.1–4 (N=4). The first plain text cell is sent to encryption device module 52.1, the second to module 52.2, the third to module 52.3 and the fourth to module 52.4. The fifth cell is sent to module 52.1, the sixth to module 52.2, and so on. The decryption mode (not shown) operates in a similar manner. It distributes cells of cipher text to the available modules 52 in a predetermined manner. (Note that the encryptor and decryptor must have the same number of logical modules 52 to maintain cryptographic synchronization. The result of this multiplexing is that the cipher feedback in each module 52 can be passed through each codebook 32 independently.

As described previously, the logical model shown in FIG. 11a may be implemented in a variety of ways. One embodiment is shown in FIG. 7a. In this embodiment, feedback FIFO memory 78 implements feedback registers 74 of FIG. 11a while output FIFO module 34 implements output registers 54. It should be noted that FIFO modules 34 and 75 are logical FIFOs. That is, they can be implemented with dedicated FIFO hardware or in memory such as DRAM. Exclusive OR function 72 is used to exclusive OR (modulo-two addition) the keystream with the incoming plain text just as in the conventional cipher feedback mode.

Codebook module 32 extracts cipher text cells from feedback FIFO memory 78 and encrypts them to create pseudorandom vectors. The pseudorandom vectors are then written into output FIFO module 34 where they can be used to encrypt subsequent plain text cells. As was discussed previously, codebook module 32 may be implemented using two or more codebooks. When this is done, one must be careful to preserve the order of the cells as they are extracted from feedback FIFO memory 78, passed through codebook module 32 and written to output FIFO module 34. Failure to preserve the order of the cells will result in a loss of cryptographic synchronization.

One benefit of a multiplexed approach to ATM encryption is that very low latency can be achieved. The pseudorandom vectors are already present in output FIFO module 34 when the plain text cell arrives. Therefore the time to encrypt a cell is the time required to read the pseudorandom vector from memory and perform the exclusive OR. In contrast, other known devices do not store a complete cell's worth of pseudorandom vectors. Therefore, they must move keystream into the cryptographic engine and pass data through the encryption algorithm a number of times in order to generate the required pseudorandom vectors. In the Stevenson device described above, this computational time approached seven microseconds.

In addition, higher speed and lower cost is possible in the device of FIG. 7a because, since a sequence of cells is distributed across a number of logical encryption device modules 52, codebooks 76 can be placed in parallel without impacting the integrity of the cryptography. As can be seen in FIG. 7a, two codebooks 76 can be used in parallel to provide the throughput of a single device operating at twice their clock rate. Cipher text received at input 77 of codebook module 32 is applied to each of the codebooks 76 in a ping-pong fashion to achieve this higher throughput. In contrast, existing ATM approaches require a single encryption device which must be pushed to higher and higher rates as throughput increases.

Key Agility

Figure 8A:
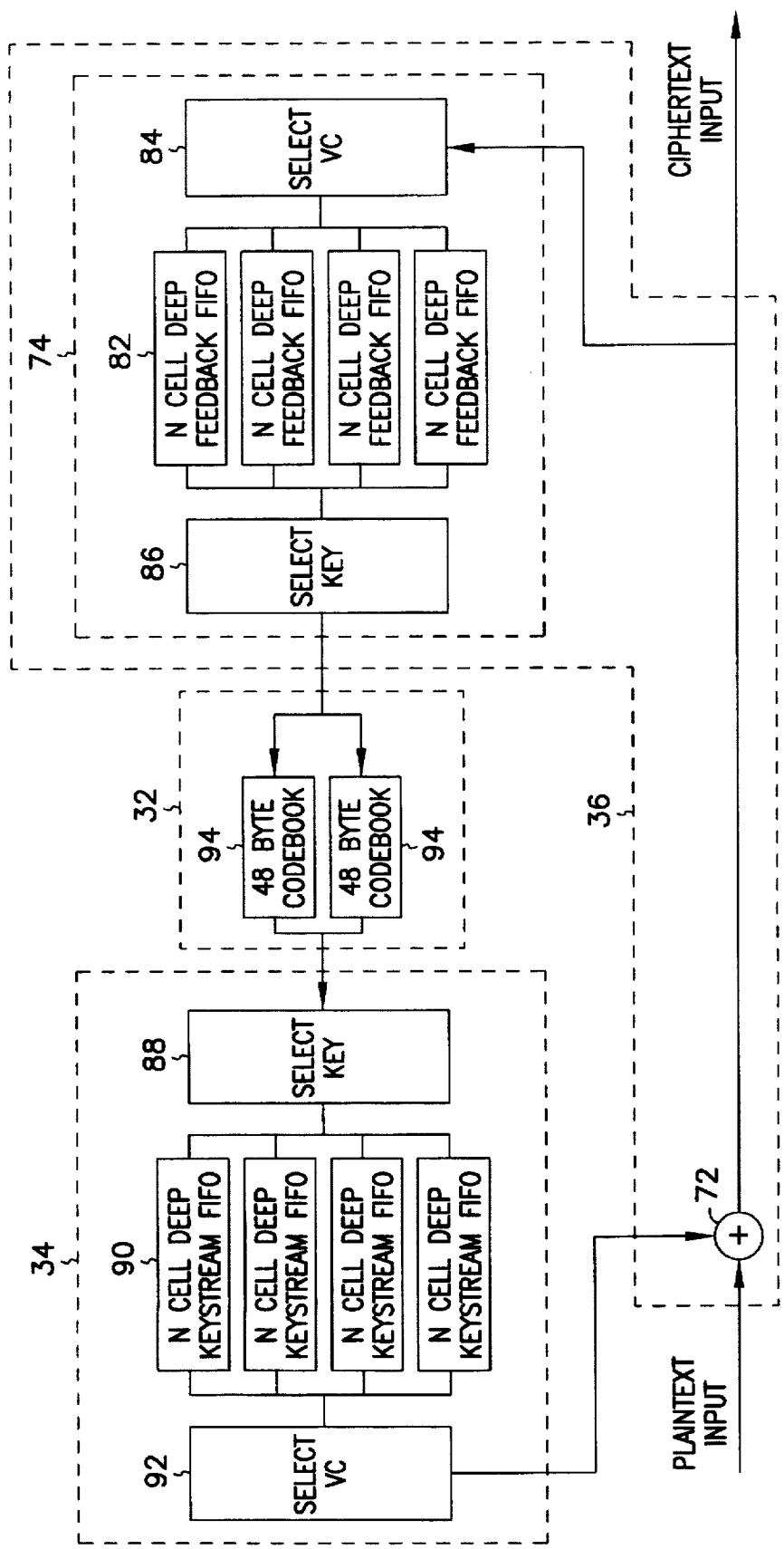

The multiplexing techniques described above can also be used to provide key agility. This is done by replicating the output FIFO memory and the feedback FIFO memory and selecting the appropriate FIFO memory based on some keystream indicator. Examples of such an approach are shown in FIGS. 8a and 8b. The example in FIG. 8a shows a cipher feedback mode embodiment. The example in FIG. 8b shows an output feedback mode embodiment. These key agility techniques can easily be extended, however, to other cryptographic modes. These techniques have particular relevance in systems such as ATM, TCP/IP and SONET but can be used to provide key agility in any situation where more than one type of plain text block is used or in virtual channel environments where more than one channel of communication can be used at a time.

In the systems of FIGS. 8a and 8b, a pair of FIFO memories (an output FIFO memory 90 and a feedback FIFO memory 82) are provided for each active keystream. A demultiplexer 84 distributes cipher text blocks to the appropriate feedback FIFO memory 82 based on a channel indicator. A keystream indicator selects, via multiplexer 86, the appropriate stream of keystream blocks to be routed through codebook module 32.

At the other end, select key demultiplexer 88 distributes pseudorandom vectors received from codebook module 32 to the appropriate output FIFO memory 90 based on a keystream indicator. A channel indicator selects, via multiplexer 92, the appropriate stream of pseudorandom vectors to be routed to encryption module 36 in order to encrypt the plain text blocks coming in on that channel.

An ATM embodiment of the encryption circuit of FIG. 8a will be described next. The operation is described in two stages: initialization and steady state.

Initialization

Assume that a different cryptographic key is used for each virtual channel (VC). The key for the virtual channel is established during initialization using conventional key management techniques. An initialization vector shared by the sender and the receiver is established. The initialization vector is used to generate a set of pseudorandom vectors which are written to one of the output FIFO memories 90 of output memory module 34. At this point the device is ready to encrypt cells and the transition to steady state operation is made.

Steady State

A cell to be encrypted arrives at the encryption device and the virtual channel number is pulled from the cell header. Select VC function 92 determines the output FIFO memory 90 where the appropriate stream of pseudorandom vectors is stored. A second select VC function 84 selects the feedback FIFO memory 82 in which the resulting cipher text will be written. The pseudorandom vector is read from the appropriate output FIFO 90, exclusive ORed with the plain text cell and the resulting cipher text cell is transmitted and then written into the appropriate feedback FIFO memory 82. Note that no key or data had to be loaded into any of the codebooks 94 as part of the cell encryption process.

Select key function 86 is decoupled from the stream of incoming cells. As a pseudorandom vector is used up select key function 86 selects the output/feedback FIFO pair with the lowest amount of precomputed pseudorandom vectors. The key associated with that pair of FIFOs is loaded into codebook 32, cipher text cells stored in feedback FIFO memory 82 is read one at a time and processed by codebook(s) 94 to form pseudorandom vectors. The resulting pseudorandom vectors are written to the corresponding output FIFO memory 90. This process allows many cells worth of pseudorandom vectors to be generated without the overhead of swapping the key for each cell. The key swap time is therefore amortized across the number of cells stored in the selected feedback FIFO memory 82, decreasing the effective time required to generate the pseudorandom vectors needed for each cell in that virtual channel. The output feedback mode embodiment of FIG. 8b operates in a similar manner.

Wide Codebooks

The encryption circuits in FIGS. 8a and 8b show codebooks 32 made up of two wide codebooks 94. In the embodiments shown, codebooks 94 are built as wide as the ATM cell payload. That is, each wide codebook 94 can secret key encrypt a complete 48 byte block. The technique used to achieve this is described next.

Many cryptographic algorithms and modes were developed when transistors were expensive and communications links were relatively slow and noisy. As integrated circuit technology has advanced the cost of transistors has dropped significantly. Advances in semiconductor technology also allow more transistors to be placed on a chip. At the same time communications links have become faster and the bit error rate has dropped. The wide codebooks described here provide a means to leverage off the decreasing cost of transistors to improve performance. Wide codebooks allow more transistors to be used in parallel to perform the encryption. In addition, the mixing and dispersion which can be provided by the wide codebooks result in greater cryptographic strength. The wide codebook also allows the use of different keys in each of the algorithm implementations (typically chips) so that the overall key space is increased. This also adds to the cryptographic strength. The wide codebook can, however, result in greater error extension, depending on the cryptographic mode. The bits rates of state of the art networks are, however, so low that error extension is no longer a serious issue.

Figure 12A:
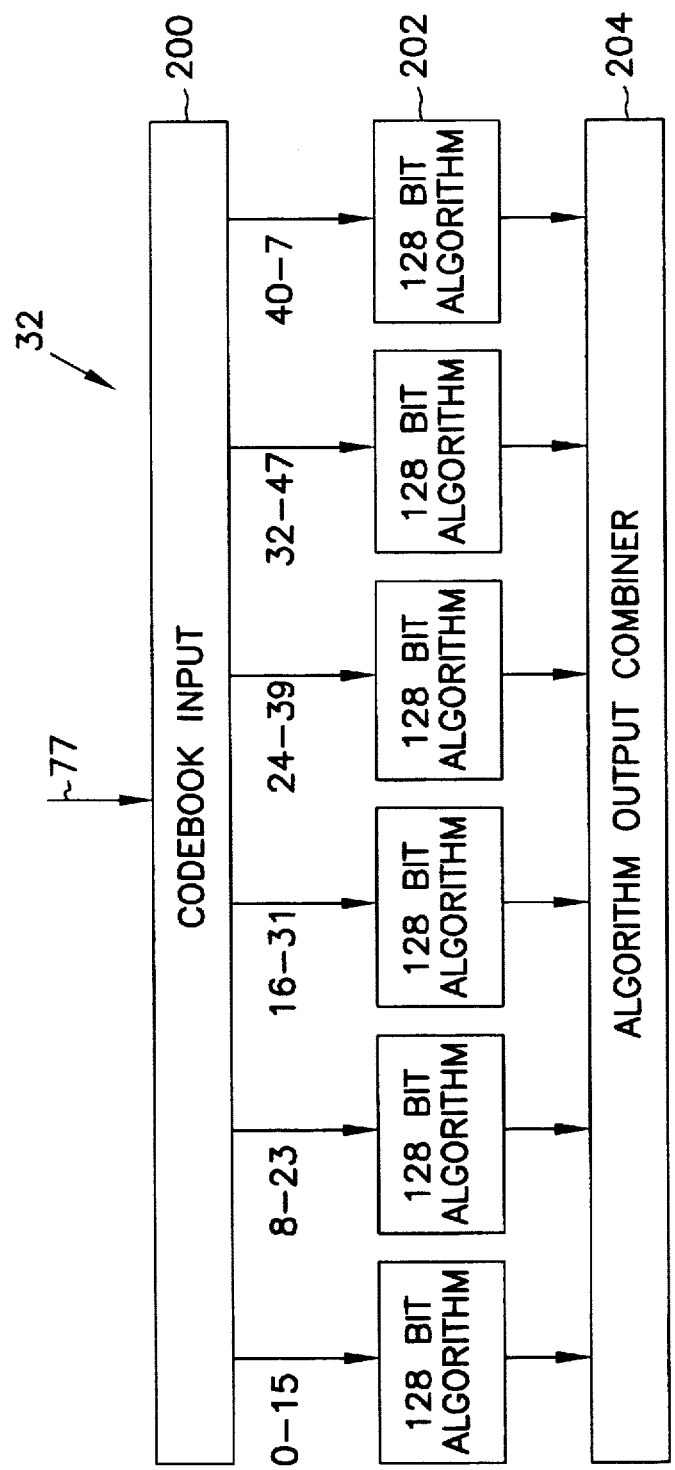
FIGS. 12a–d show different embodiments of wide codebooks.

One embodiment of a wide codebook 32 is shown in FIG. 12a. In FIG. 12a, codebook 32 includes a codebook input module 200 which breaks data received at codebook input 77 into pieces and distributes them to one or more encryption algorithm devices 202. Encryption algorithm devices 202 implement standard cryptographic algorithms such as the Data Encryption Standard (DES) or SKIPJACK.

The number of encryption algorithm devices 202 used to build wide codebook 32 can vary. Generally, the cryptographic strength of the mode is increased by using more encryption algorithm devices 202. Detailed designs using 4 and 6 encryption algorithm devices have already been produced; other numbers of encryption algorithm devices are also possible. In one embodiment, codebook input element 202 distributes data among the encryption algorithm devices in the manner necessary to ensure that a single bit toggle in the cipher text will result in a change in each output bit of the recombined keystream with a probability of 0.5.

The output of encryption algorithm devices 202 is combined in the algorithm output combiner 204. This combination process applies cryptographic principles to combine outputs of encryption algorithm devices 202 so as to produce a pseudorandom vector keystream the width of the wide codebook. The result is that a wide block of output an entire cells worth of keystream may be produced in the time normally required to pass a block of data through a single encryption algorithm device 3. This parallel processing improves throughput.

This wide codebook approach is scalable in several respects. Wide codebook module 32 is scalable because the number of multiple encryption algorithm devices 202 used to build wide codebook module 32 can range from one up to the maximum number designed into the codebook. To state this another way, wide codebook module 32 of FIG. 12a could be built using six encryption algorithm devices 202. It could also be built using only one encryption algorithm device 202. If a single device is used the segmented data would be run though the same physical encryption algorithm device sequentially (time multiplexing). Bytes 0–15 would first be encrypted, then bytes 8–23, etc. Finally the result from the encryption of the 6 segments would be combined. The advantage of this amount of design freedom is that is a high speed encryption device (e.g., at a central server) could use six encryption algorithm devices to achieve high speeds while a low cost, slow speed device at the other end of the communications link could be implemented using only one encryption algorithm device 202. The encryption devices are able to securely exchange data and decrypt it even through they use a different number of encryption algorithm devices 202 to implement each wide codebook module 32.

Wide codebook module 32 could be designed to be any fixed width (e.g., 32 bytes, 64 bytes, etc.). The first working models will be based on the ATM cell size of 48 bytes. Codebook input module 200 distributes the input bytes to the available encryption algorithms in a way such as to maximize the dispersion. Algorithm output combiner 204 then combines the output of encryption algorithm devices 202 so as to ensure that changing a single bit of the data at input 77 creates a 50% probability that any one bit of the output will change. This dispersion can be achieved using a combination of overlapping input and appropriate output combiner 204 mechanisms.

Figure 12B:
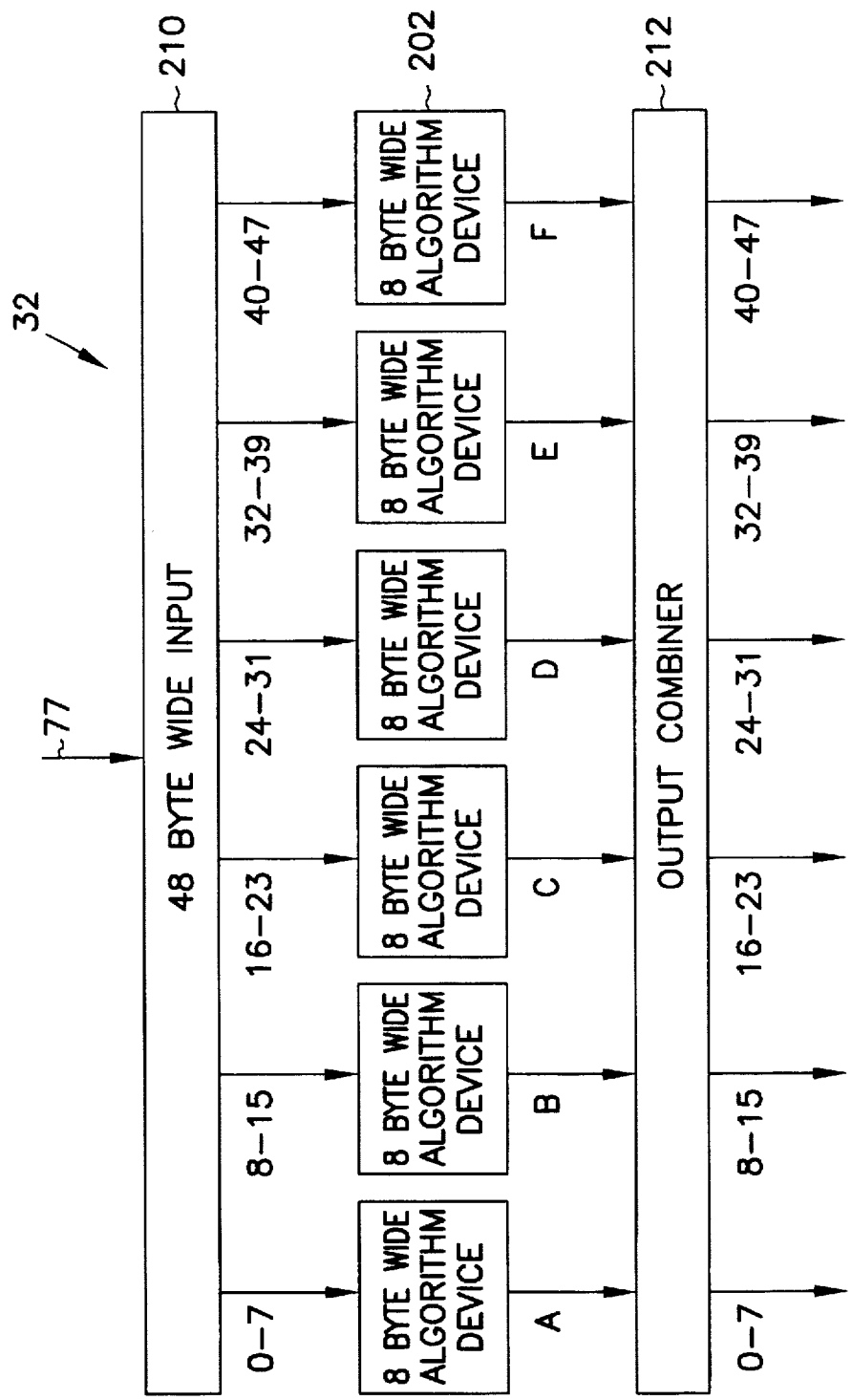

FIG. 12b illustrates a six encryption algorithm device embodiment of a 48 byte wide codebook. Codebook input module 210 distributes the bytes of the ATM payload as shown. Each eight byte segment of data is then encrypted in its respective encryption algorithm device 202 with a secret key encryption algorithm. The output of each encryption algorithm device 202 is then combined at combiner 212.

In one embodiment, codebook input module 210 distributes data among encryption algorithm devices 202 and output combiner 212 combines data received from devices 202 in such a manner that a single bit toggle in the cipher text will result in a change in each output bit of the recombined keystream with a probability of 0.5. In one such embodiment, the output of each encryption algorithm device 202 is combined at combiner 212 as follows:

Bytes 0–7=*A+B+C+D+E+F
Bytes 8–15=A+*B+C+D+E+F
Bytes 16–23=A+B+*C+D+E+F
Bytes 24–31=A+B+C+*D+E+F
Bytes 32–39=A+B+C+D+*E+F
Bytes 40–47=A+B+C+D+E+*F where * is the inverse of the output of encryption algorithm device 202. That is, *A is the inverse of A.

Figure 12C:
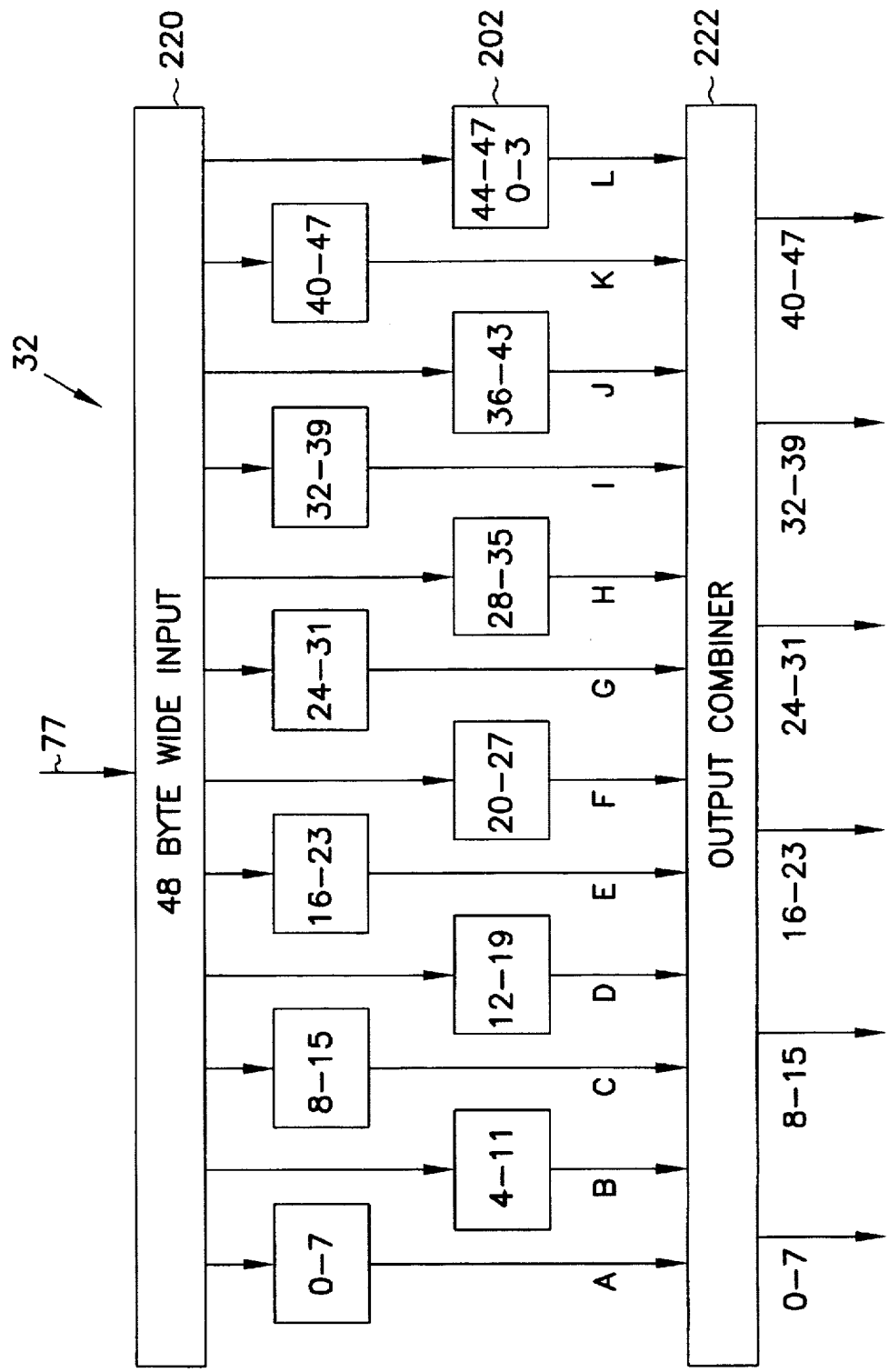

FIG. 12c illustrates a twelve encryption algorithm device embodiment of a 48 byte wide codebook. Codebook input module 220 distributes the bytes of the ATM payload as shown. Each eight byte segment of data is then encrypted in its respective encryption algorithm device 202 with a secret key encryption algorithm. The output of each encryption algorithm device 202 is then combined at combiner 222.

Figure 12D:
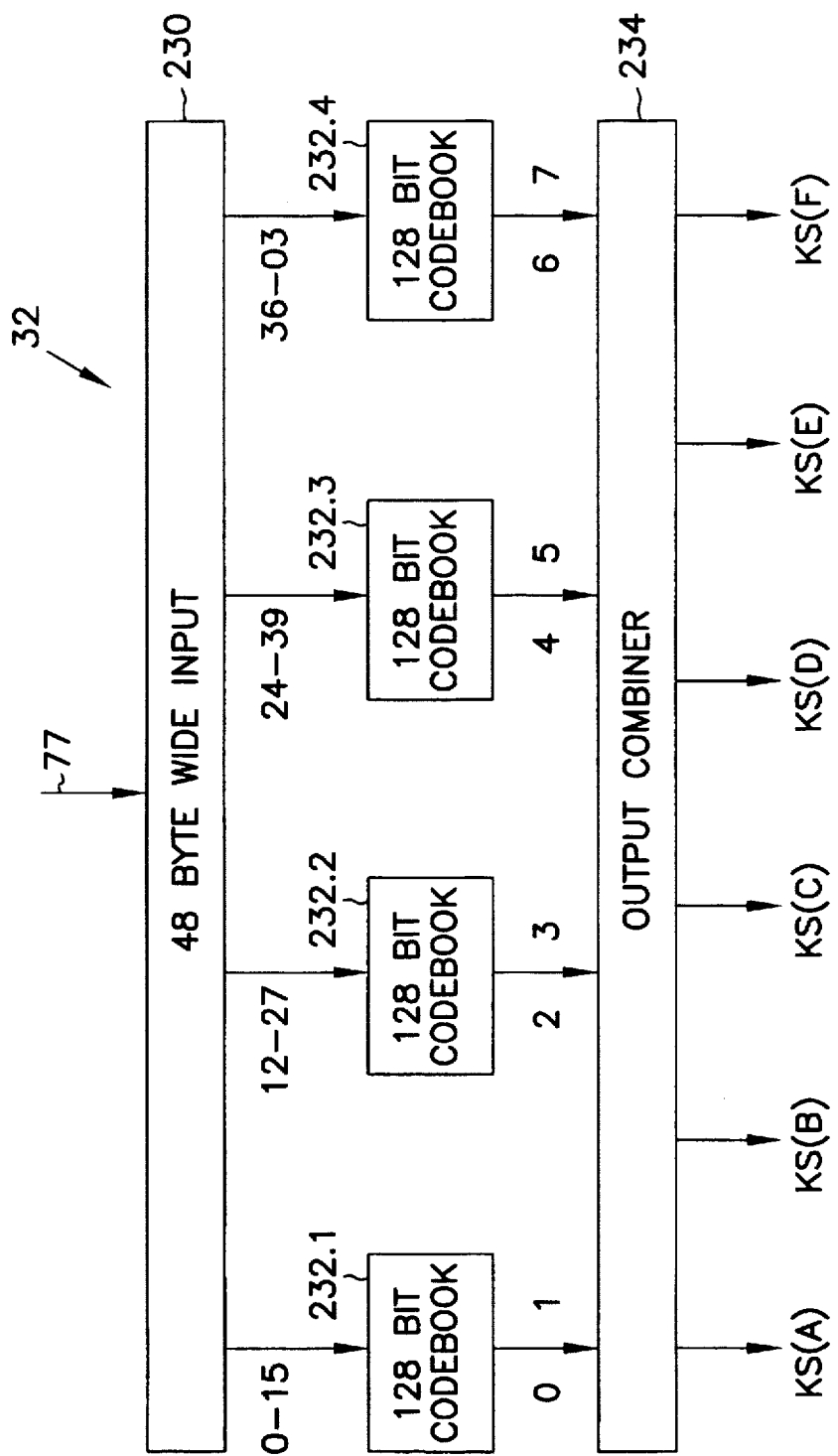

In one embodiment, codebook input module 220 distributes data among encryption algorithm devices 202 and output combiner 222 combines data received from devices 202 in such a manner that a single bit toggle in the cipher text will result in a change in each output bit of the recombined keystream with a probability of 0.5. In one such embodiment, the output of each encryption algorithm device 202 is combined at combiner 222 as follows:

Bytes 0–7=A+B+C+E+G+I+K
Bytes 8–15=A+C+D+E+G+I+K
Bytes 16–23=A+C+E+F+G+I+K
Bytes 24–31=A+C+E+G+H+I+K
Bytes 32–39=A+C+E+G+I+J+K
Bytes 40–47=A+C+E+G+I+K+L Finally, FIG. 12d illustrates a four encryption algorithm device embodiment of a 48 byte wide codebook. Codebook input module 230 distributes the bytes of the ATM payload as shown. Each sixteen byte segment of data is then encrypted in its respective encryption algorithm device 232 with a secret key encryption algorithm. The output of each encryption algorithm device 232 is then combined at combiner 234.

In one embodiment, codebook input module 230 distributes data among encryption algorithm devices 232 and output combiner 234 combines data received from devices 232 in such a manner that a single bit toggle in the cipher text will result in a change in each output bit of the recombined keystream with a probability of 0.5. In one such embodiment, the output of each encryption algorithm device 232 is combined at combiner 234 as follows:

Bytes 0–7 (KS(A))=1+2+3+4+5+7
Bytes 8–15 (KS(B))=0+2+3+4+5+6
Bytes 16–23 (KS(C))=0+1+3+4+5+7
Bytes 24–31 (KS(D))=0+1+2+4+5+7
Bytes 32–39 (KS(E))=0+1+2+3+5+7
Bytes 40–47 (KS(F))=0+1+2+3+4+6 where 0, 2, 4, and 6 are the most significant eight bytes of the 128 bit output of codebooks 202.1–4, respectively, and 1, 3, 5, and 7 are the least significant eight bytes of the 128 bit output of codebooks 202.1–4, respectively.

Although the present invention has been described with reference to the preferred embodiments, those skilled in the art will recognize that changes may be made in form and detail without departing from the spirit and scope of the invention.

What is claimed is:

1. A method of encrypting a plurality M of plain text blocks, the method comprising the steps of:

providing a plurality N of memory locations, where M>N and N>1;

storing precomputed pseudorandom vectors in each of the plurality of memory locations; and encrypting the ith plain text block, wherein M>i>N and wherein the step of encrypting the ith plain text block comprises the steps:

a) performing a first function CT(i)=f(PT(i),PV(i-N)), where CT(i) is the ith cipher text block, PT(i) is the plain text block for iteration i, PV(i-N) is the pseudorandom vector calculated during iteration i-N and the first function, f( ), is a first encryption algorithm;

b) calculating a new pseudorandom vector, wherein the step of calculating a new pseudorandom vector comprises the step of performing a second function [PV(i)=g(PV(i-N))]g( ) on PV(i-N) to calculate PV(i), where PV(i) is the pseudorandom vector calculated during iteration i, PV(i-N) is the pseudorandom vector calculated during iteration i-N and the second function, g( ), is a second encryption algorithm; and c) storing the new pseudorandom vector in one of the N memory locations.

2. The method according to claim 1 wherein the function f( ) is modulo-two addition.

3. The method according to claim 2 wherein the function g( ) is secret key encryption of the pseudorandom vector PV(i-N).

4. The method according to claim 2 wherein the function g( ) is secret key encryption of the cipher text block CT(i).

5. The method according to claim 1 wherein the function g() is secret key encryption of the modulo-two addition of pseudorandom vector PV(i-N) and plain text block PT(i).

6. A method of encrypting a plain text block to form a cipher text block, the method comprising the steps of:

providing an encryption circuit having an output FIFO of depth N, where N>1;

storing N precomputed pseudorandom vectors in the output FIFO;

performing a function CT=f(PT,PV), where CT is the cipher text block, PT is the plain text block encrypted, PV is the pseudorandom vector which was least recently stored in the output FIFO and f( ) is the encryption function;

computing a new pseudorandom vector, wherein the step of computing a new pseudorandom vector comprises the step of performing a function g( ) on PV; and storing the new pseudorandom vector in the output FIFO.

7. The method according to claim 6 wherein the function f( ) is modulo-two addition.

8. The method according to claim 7 wherein the function g( ) is secret key encryption of the pseudorandom vector PV.

9. The method according to claim 7 wherein the function g( ) is secret key encryption of the cipher text block CT.

10. The method according to claim 6 wherein the function g( ) is secret key encryption of the modulo-two addition of pseudorandom vector PV and plain text block PT.

11. The method according to claim 6 wherein the step of providing an encryption circuit having an output FIFO comprises the steps of:

determining a latency of encryption of the encryption circuit;

determining a desired throughput; and calculating N as a function of the latency of encryption and the desired throughput.

12. The method according to claim 11 wherein the latency of encryption is N clock cycles and the desired throughput is one plain text block per clock cycle.

13. An encryption device, comprising:

a codebook module having an input, wherein the codebook module applies a secret key algorithm to data received at the input in order to produce pseudorandom vectors;

an output FIFO module connected to the codebook module, wherein the output FIFO module comprises a first output FIFO memory having a depth N, where N>1, wherein the first output FIFO memory stores pseudorandom vectors received from the codebook module and transmits the pseudorandom vectors received on a first in, first out basis; and an encryption module connected to the output FIFO module, wherein the encryption module includes encryption means for encrypting plain text as a function of the pseudorandom vectors stored in the output FIFO module in order to form cipher text, wherein the encryption module further includes transmission means for transmitting data to the codebook module to be used in generating pseudorandom vectors.

14. The device according to claim 13, wherein the transmission means transmits back to the codebook module the pseudorandom vectors received from the codebook module.

15. The device according to claim 13, wherein the transmission means transmits the cipher text back to the codebook module.

16. The device according to claim 13, wherein the encryption module further comprises a feedback FIFO module connected to the codebook module, wherein the feedback FIFO module comprises a first feedback FIFO memory.

17. The device according to claim 16, wherein the encryption module further comprises a second feedback FIFO memory and a first multiplexer connected to said first and second feedback FIFO memories, wherein the output FIFO module further comprises a second output FIFO memory and a second multiplexer connected to said first and second output FIFO memories, wherein each of said FIFO memories has a depth N and wherein the first and second multiplexers operate under the control of a keystream indicator to selectively transmit data from the first and second feedback and output FIFOs.

18. The device according to claim 17, wherein the codebook module comprises a first codebook, wherein the first codebook applies a secret key cryptographic algorithm.

19. The device according to claim 13, wherein the codebook module comprises a first codebook, wherein the first codebook applies a secret key cryptographic algorithm.

20. An encryption device, comprising:
a codebook module, wherein the codebook module comprises a codebook input and a first codebook, the first codebook comprising:
a plurality of encryption algorithm devices, wherein each encryption algorithm device applies a secret key cryptographic algorithm;
a codebook input module connected to the codebook input and to the plurality of encryption algorithm devices, wherein the codebook input module distributes data received at the codebook input to the plurality of encryption algorithm devices according to a dispersion algorithm;
a combiner module connected to the plurality of encryption algorithm devices, wherein the output combiner combines data received from the plurality of encryption algorithm devices to form pseudorandom vectors, wherein the combiner module includes means for forming at least one bit of the keystream as a function of data received from two or more of the plurality of encryption algorithm devices;
an output memory module connected to the codebook module, wherein the output memory module comprises a first output FIFO memory of depth N, where N is an integer number greater than one, wherein the first output FIFO memory stores pseudorandom vectors received from the codebook module and transmits the pseudorandom vectors received on a first in, first out basis; and
encryption means, connected to the output memory module, for combining the pseudorandom vectors stored in the output FIFO module with plain text to form cipher text, wherein the encryption means includes transmission means for generating data to be fed back into the codebook module.

21. The encryption device according to claim 20 wherein the dispersion algorithm is selected such that a change of a single bit in the data received at the codebook input module will cause each bit of the pseudorandom vector calculated from that data to change with a probability of approximately 0.5.

22. The device according to claim 20, wherein the transmission means transmits back to the codebook module the pseudorandom vectors received from the codebook module.

23. The device according to claim 20, wherein the transmission means transmits the cipher text back to the codebook module.

24. The device according to claim 20, wherein the encryption module further comprises a feedback FIFO module connected to the encryption module, wherein the feedback FIFO module comprises a first feedback FIFO memory having a depth greater than one.

25. The device according to claim 24, wherein the codebook module further includes a second feedback FIFO memory and a first multiplexer connected to said first and second feedback FIFO memories, wherein the output FIFO module further comprises a second output FIFO memory and a second multiplexer connected to said first and second output FIFO memories, wherein each of the FIFO memories has a depth greater than one and wherein the first and second multiplexers operate under the control of a keystream indicator to selectively transmit data from the first and second feedback and output FIFO memories.

26. The encryption device according to claim 20 wherein the codebook module further comprises a second codebook connected in parallel to the first codebook to increase throughput through the codebook module.

27. A method of encrypting a packet having a header and an M byte payload, the method comprising the steps of:
providing an encryption circuit including a memory connected to a codebook module, wherein the codebook module includes a plurality of encryption algorithm devices;
storing a first M byte pseudorandom vector in the memory;
encrypting the M byte payload with the first M byte wide pseudorandom vector read from the memory;
generating an M byte keystream; and
generating a second M byte wide pseudorandom vector, wherein the step of generating the second M byte wide pseudorandom vector comprises the steps of:
a) distributing the M byte keystream across the plurality of encryption algorithm devices according to a dispersion algorithm;
b) encrypting the distributed keystream with a secret key encryption algorithm;
c) recombining the encrypted distributed keystream as a function of the dispersion algorithm to form the second M byte wide pseudorandom vector, wherein the step of recombining includes the step of forming at least one bit of the keystream as a function of data received from two or more of the plurality of encryption algorithm devices; and
d) storing the second M byte wide pseudorandom vector in the memory.

28. The method according to claim 27, wherein the step of storing the first M byte wide pseudorandom vector comprises the steps of:
providing an M byte initialization vector;
distributing the M byte initialization vector across the plurality of encryption algorithm devices according to the dispersion algorithm;
encrypting the distributed M byte initialization vector with a secret key encryption algorithm; and recombining the encrypted distributed keystream as a function of the dispersion algorithm to form the first M byte wide pseudorandom vector, wherein the step of recombining includes the step of forming at least one bit of the keystream as a function of data received from two or more of the plurality of encryption algorithm devices.

29. A method of encrypting a plurality of packets, including a first and a second packet, wherein each of the plurality of packets include a header and an M byte payload, the method comprising the steps of:

providing an encryption circuit including a memory connected to a codebook module, wherein the codebook module includes a plurality of encryption algorithm devices;

providing a plurality of M byte pseudorandom vectors, including a first and a second M byte pseudorandom vector;

storing the plurality of M byte pseudorandom vectors in the memory;

retrieving in successive order the plurality of M byte pseudorandom vectors;

encrypting in the same successive order the M byte payloads of the plurality of packets;

generating a plurality of M byte keystream; and generating a plurality of new M byte wide pseudorandom vectors, wherein the step of generating the plurality of new M byte wide pseudorandom vector comprises the steps of:

a) distributing the plurality of M byte keystream across the plurality of encryption algorithm devices according to a dispersion algorithm;

b) encrypting the distributed M byte keystream with a secret key encryption algorithm;

c) recombining the encrypted distributed M byte keystream as a function of the dispersion algorithm to form the plurality of new M byte wide pseudorandom vectors, wherein the step of recombining includes the step of forming at least one bit of the pseudorandom vectors as a function of data received from two or more of the plurality of encryption algorithm devices; and d) storing the new M byte wide pseudorandom vectors in the memory.

30. The method according to claim 29, wherein the step of providing a memory includes the step of providing a first and a second output FIFO memory, wherein each output FIFO memory has a depth greater than one and wherein the step of storing the new M byte wide pseudorandom vectors in the memory includes the step of determining whether the new M byte wide pseudorandom vectors should be placed in said first or said second output FIFO memory.

31. An encryption device, comprising:

a ciphertext memory module for storing ciphertext;

a codebook module, connected to the ciphertext memory module, wherein the codebook module comprises a first codebook, the first codebook comprising:

a plurality of encryption algorithm devices;

an input module connected to the ciphertext memory module and to the plurality of encryption algorithm devices, wherein the input module distributes the ciphertext received from the ciphertext memory module according to a dispersion algorithm;

output means, connected to the plurality of encryption algorithm devices, for forming keystream by combining data received from the plurality of encryption algorithm devices according to the dispersion algorithm, wherein the output means includes means for forming at least one bit of the keystream as a function of data received from two or more of the plurality of encryption algorithm devices;

a keystream memory module, connected to the output means, for storing keystream generated from the ciphertext; and encryption means, connected to the keystream memory module, for combining the keystream with plaintext to form ciphertext and for feeding the ciphertext back into the ciphertext memory module.

32. The encryption device according to claim 31 wherein the dispersion algorithm is such that a change of a single bit in the ciphertext received at the input module will cause each bit of the keystream calculated from the ciphertext to change with a probability of approximately 0.5.

33. The encryption device according to claim 31 wherein the ciphertext memory module comprises a first ciphertext FIFO memory used to store first ciphertext, wherein the first ciphertext FIFO memory has a depth sufficient to store at least two packets of ciphertext; and wherein the keystream memory module comprises a first keystream FIFO memory, connected to the output means, for storing first keystream generated from the first ciphertext, wherein the first keystream FIFO memory has a depth sufficient to store at least two packets of keystream.

34. The encryption device according to claim 33 wherein the ciphertext memory module further comprises:

a second ciphertext FIFO memory used to store second ciphertext, wherein the second ciphertext FIFO memory has a depth sufficient to store at least two packets of ciphertext; and a multiplexer, connected to the first and second ciphertext FIFO memories and to the input module, for selectively applying ciphertext from the first and second ciphertext FIFO memories to the input means to achieve a desired keystream.

35. The encryption device according to claim 34 wherein the keystream memory module further comprises:

a second keystream FIFO memory used to store second keystream, wherein the second keystream FIFO memory has a depth sufficient to store at least two packets of keystream; and a multiplexer, connected to the first and second keystream FIFO memories and to the encryption means, for selectively encrypting plaintext with keystream read from the first and second keystream FIFO memories.

36. A method of encrypting packets having a header and an N byte payload, the method comprising the steps of:

providing a ciphertext memory module for storing ciphertext;

providing a codebook module, connected to the ciphertext memory module, wherein the codebook module comprises a first codebook, the first codebook comprising:

a plurality of encryption algorithm devices;

an input module connected to the ciphertext memory module and to the plurality of encryption algorithm devices, wherein the input module distributes the ciphertext received from the ciphertext memory module according to a dispersion algorithm;

output means, connected to the plurality of encryption algorithm devices, for forming keystream by combining data received from the plurality of encryption algorithm devices according to the dispersion algorithm, wherein the output means includes means for forming at least one bit of the keystream as a function of data received from two or more of the plurality of encryption algorithm devices;

providing a keystream memory module, connected to the output means, for storing keystream generated from the ciphertext;

generating a first N byte wide keystream word;

encrypting the N byte payload with the first N byte wide keystream word;

storing the encrypted N byte payload in the ciphertext memory module; and generating a second N byte wide keystream word, wherein the step of generating the second N byte wide keystream word comprises the steps of:

distributing the encrypted N byte payload across the plurality of encryption algorithm devices according to a dispersion algorithm;

generating keystream data in the plurality of encryption algorithm devices as a function of the distributed payload; and recombining the keystream data as a function of the dispersion algorithm to form the second N byte wide keystream; and storing the second N byte wide keystream in the keystream memory module.

37. The method according to claim 36, wherein the step of generating the first N byte wide keystream comprises the steps of:

providing an initialization vector;

distributing N bytes of the initialization vector across the plurality of encryption algorithm devices according to the dispersion algorithm;

generating initial data in the plurality of encryption algorithm devices as a function of the distributed ciphertext; and recombining the initial data as a function of the dispersion algorithm to form the first N byte wide keystream.

38. The method according to claim 36, wherein the keystream memory module includes a keystream FIFO, wherein the keystream FIFO has a depth sufficient to store at least two N byte keystream words, and wherein the step of storing the second N byte wide keystream includes the step of:

storing the second N byte wide keystream in said keystream FIFO.

39. The method according to claim 38, wherein the step of providing a keystream memory module includes the steps of:

determining a latency of keystream generation, wherein the latency of keystream generation is a function of the time needed to calculate new keystream; and sizing the keystream FIFO to hide the latency of keystream generation.

40. The method according to claim 36, wherein the step of storing the encrypted N byte payload includes the steps of:

providing a ciphertext FIFO sufficient to store a plurality of N byte payloads; and storing the encrypted N byte payload in said ciphertext FIFO.

41. A method of encrypting a plurality of packets, wherein each packet includes a header and an N byte payload, the method comprising the steps of:

a) providing a keystream memory;

b) providing a plurality of encryption algorithm devices;

c) providing a first keystream, wherein the first keystream includes a plurality of N byte keystream words, including a first and a second N byte keystream word;

d) storing the plurality of N byte keystream words in the keystream memory;

e) encrypting the payload of one of the plurality of packets with the first N byte keystream word;

f) generating an N byte keystream word from the encrypted payload, wherein the step of generating comprises the steps of:

distributing the encrypted payload across the plurality of encryption algorithm devices according to a dispersion algorithm;

generating keystream data in the plurality of encryption algorithm devices as a function of the distributed encrypted payload; and recombining the keystream data as a function of the dispersion algorithm to form the N byte wide keystream word, wherein the step of recombining includes the step of forming at least one bit of the N byte wide keystream word as a function of data received from two or more of the plurality of encryption algorithm devices;

g) storing the recombined N byte keystream word into the keystream memory; and h) repeating steps e-g for each packet of the plurality of packets.

42. The method according to claim 41, wherein the step of providing a keystream memory includes the step of providing a first and a second keystream FIFO memory, wherein each of said first and second keystream FIFO memories has a depth sufficient to store at least two N byte keystream words, and wherein the step of storing the recombined N byte keystream word includes the step of determining whether the recombined N byte keystream word should be placed in said first or said second keystream FIFO memory.

43. The method according to claim 41, wherein the step of encrypting includes the step of storing the encrypted payload in ciphertext memory.

44. An encryption system, comprising:

a ciphertext memory module for storing a plurality of ciphertext, wherein the ciphertext memory module comprises a first ciphertext FIFO memory used to store first ciphertext from the plurality of ciphertext, wherein the first ciphertext FIFO memory has a depth sufficient to store at least two words of first ciphertext;

an encryption algorithm device, connected to the ciphertext memory module, wherein the encryption algorithm device includes a keystream generator for generating first keystream from the first ciphertext;

a keystream memory module, wherein the keystream memory module comprises a first keystream FIFO memory connected to the encryption algorithm device for storing the first keystream, wherein the first keystream FIFO memory has a depth sufficient to store at least two words of first keystream; and encryption means, connected to the keystream memory module, for combining the keystream with plaintext to form ciphertext and for feeding the ciphertext back into the ciphertext memory module.

45. The encryption system according to claim 44 wherein the ciphertext memory module further comprises:

a second ciphertext FIFO memory used to store second ciphertext, wherein the second ciphertext FIFO memory has a depth sufficient to store at least two words of second ciphertext; and a multiplexer, connected to the first and second ciphertext FIFO memories and to the input module, for selectively applying ciphertext from the first and second ciphertext FIFO memories to the input means to achieve a desired keystream.

46. The encryption system according to claim 45 wherein the keystream memory module further comprises:

a second keystream FIFO memory used to store second keystream, wherein the second keystream FIFO memory has a depth sufficient to store at least two words of second keystream; and a multiplexer, connected to the first and second keystream FIFO memories and to the encryption means, for selectively encrypting plaintext with keystream read from the first and second keystream FIFO memories.

* * * * *